(12) United States Patent
Gaffney et al.

(10) Patent No.: US 12,015,617 B2
(45) Date of Patent: Jun. 18, 2024

(54) SYSTEMS AND METHODS FOR PROVIDING SECURE ACCESS TO COLLABORATION ROOMS WITH DYNAMIC TENANCY IN RESPONSE TO AN EVENT

(71) Applicant: Cygnvs Inc., Los Altos, CA (US)

(72) Inventors: Kevin Gaffney, Dublin (IE); Paul Meagher, Dublin (IE); Marlon Rodrigues, Dublin (IE); Jordan McGrath, Dublin (IE); Omar Anshasi, Dublin (IE)

(73) Assignee: Cygnvs Inc., Los Altos, CA (US)

(*) Notice: Subject to any disclaimer, the term of this patent is extended or adjusted under 35 U.S.C. 154(b) by 0 days.

(21) Appl. No.: 18/196,967

(22) Filed: May 12, 2023

(65) Prior Publication Data

US 2023/0291744 A1    Sep. 14, 2023

Related U.S. Application Data

(63) Continuation-in-part of application No. 17/939,865, filed on Sep. 7, 2022, which is a continuation of application No. 17/476,367, filed on Sep. 15, 2021, now Pat. No. 11,477,208.

(51) Int. Cl.
| | | |
|---|---|---|
| *H04L 9/40* | (2022.01) | |
| *G06F 16/22* | (2019.01) | |
| *G06Q 10/101* | (2023.01) | |

(52) U.S. Cl.
CPC ........ *H04L 63/105* (2013.01); *G06F 16/2246* (2019.01); *H04L 63/0853* (2013.01); *G06Q 10/101* (2013.01)

(58) Field of Classification Search
CPC ............... H04L 63/105; H04L 63/0853; H04L 63/0807; G06F 16/2246; G06Q 10/101
USPC ............................................................ 726/4
See application file for complete search history.

(56) References Cited

U.S. PATENT DOCUMENTS

| 6,188,407 B1 | 2/2001 | Smith |
| 6,324,581 B1 | 11/2001 | Xu et al. |
| 7,587,499 B1 * | 9/2009 | Haghpassand ...... H04L 63/0281 |
| | | 709/227 |
| 8,151,323 B2 | 4/2012 | Harris |
| 8,832,268 B1 | 9/2014 | Chheda |
| 8,874,741 B2 | 10/2014 | Hassan et al. |
| 9,240,996 B1 * | 1/2016 | Sinnema ............. H04L 63/1416 |
| 9,858,559 B2 | 1/2018 | Raleigh et al. |

(Continued)

OTHER PUBLICATIONS

Trustless Two-Factor Authentication Using Smart Contracts in Blockchains; Amrutiya et al, Jan. 2019. (Year: 2019).*

(Continued)

*Primary Examiner* — Jahangir Kabir
(74) *Attorney, Agent, or Firm* — Carr & Ferrell LLP

(57) ABSTRACT

Systems and methods for providing secure access to digital collaboration rooms with dynamic tenancy in response to an event are provided. An example method includes establishing, via an orchestration service, a digital collaboration room for an entity; receiving and storing three authentication factors of a user, the three authentication factors including a first authentication factor relating a corporate email account of the user assigned by the entity; and upon an entity's request and in response to an event activating an isolate mode and isolating the digital collaboration room.

29 Claims, 12 Drawing Sheets

(56) References Cited

U.S. PATENT DOCUMENTS

| | | | |
|---|---|---|---|
| 9,953,007 B2 | 4/2018 | Oyarzabal et al. | |
| 9,990,134 B2 | 6/2018 | Keeler | |
| 10,182,045 B2 | 1/2019 | Banga et al. | |
| 10,234,853 B2 | 3/2019 | Mukkamala et al. | |
| 10,467,029 B1 | 11/2019 | Lin | |
| 10,483,003 B1 | 11/2019 | McNair | |
| 10,698,926 B2 | 6/2020 | Zhou et al. | |
| 10,708,135 B1 | 7/2020 | Elliott | |
| 10,797,964 B2 | 10/2020 | Chheda | |
| 10,810,361 B1 | 10/2020 | Venkatraman et al. | |
| 10,990,488 B1 | 4/2021 | Brown | |
| 11,017,398 B2 * | 5/2021 | Potadar | H04L 63/10 |
| 11,188,857 B1 | 11/2021 | Hill | |
| 11,354,430 B1 | 6/2022 | Tharakan et al. | |
| 11,477,208 B1 | 10/2022 | Urena | |
| 11,526,825 B2 | 12/2022 | Avala et al. | |
| 2005/0251500 A1 | 11/2005 | Vahalia et al. | |
| 2008/0086363 A1 | 4/2008 | Kass | |
| 2009/0307166 A1 | 12/2009 | Routray | |
| 2010/0088636 A1 | 4/2010 | Yerkes | |
| 2010/0169860 A1 | 7/2010 | Blazetti | |
| 2011/0010349 A1 | 1/2011 | Ellingson et al. | |
| 2011/0173679 A1 | 7/2011 | Perumal | |
| 2012/0096521 A1 | 4/2012 | Peddada | |
| 2012/0110651 A1 | 5/2012 | Van Biljon et al. | |
| 2012/0158821 A1 | 6/2012 | Barros | |
| 2013/0191531 A1 | 7/2013 | Kruglick | |
| 2014/0089039 A1 | 3/2014 | McClellan | |
| 2014/0278755 A1 | 9/2014 | Eberl et al. | |
| 2015/0112700 A1 | 4/2015 | Sublett et al. | |
| 2015/0120359 A1 | 4/2015 | Dongieux | |
| 2015/0134733 A1 | 5/2015 | Maturana et al. | |
| 2015/0154643 A1 | 6/2015 | Artman et al. | |
| 2015/0163206 A1 | 6/2015 | McCarthy et al. | |
| 2015/0172321 A1 | 6/2015 | Kirti et al. | |
| 2015/0281453 A1 | 10/2015 | Maturana et al. | |
| 2015/0310188 A1 | 10/2015 | Ford et al. | |
| 2015/0324400 A1 | 11/2015 | Sheck et al. | |
| 2016/0294854 A1 | 10/2016 | Parthasarathi et al. | |
| 2016/0335260 A1 | 11/2016 | Convertino et al. | |
| 2016/0378450 A1 | 12/2016 | Fu et al. | |
| 2016/0378728 A1 | 12/2016 | Pryhuber | |
| 2017/0006135 A1 | 1/2017 | Siebel et al. | |
| 2017/0041296 A1 | 2/2017 | Ford et al. | |
| 2017/0099181 A1 | 4/2017 | Hawking et al. | |
| 2017/0124502 A1 | 5/2017 | Brew et al. | |
| 2017/0132721 A1 | 5/2017 | Riley | |
| 2017/0149630 A1 | 5/2017 | Feller et al. | |
| 2017/0169699 A1 | 6/2017 | Will | |
| 2017/0195265 A1 | 7/2017 | Billi | |
| 2017/0255455 A1 | 9/2017 | Collier | |
| 2017/0262142 A1 | 9/2017 | Riley | |
| 2017/0282014 A1 | 10/2017 | Quinn | |
| 2018/0027006 A1 | 1/2018 | Zimmermann et al. | |
| 2018/0144314 A1 | 5/2018 | Miller | |
| 2018/0152358 A1 | 5/2018 | Chheda | |
| 2018/0165386 A1 | 6/2018 | Soundiramourthy et al. | |
| 2018/0181716 A1 | 6/2018 | Mander et al. | |
| 2018/0321820 A1 | 11/2018 | Burman | |
| 2018/0365278 A1 | 12/2018 | Klöhn | |
| 2019/0034047 A1 | 1/2019 | Kwiecien | |
| 2019/0065177 A1 | 2/2019 | Khoongumjorn et al. | |
| 2019/0095241 A1 | 3/2019 | Ago et al. | |
| 2019/0102440 A1 | 4/2019 | Tabak et al. | |
| 2019/0163814 A1 | 5/2019 | Codella | |
| 2019/0325373 A1 | 10/2019 | Dillon et al. | |
| 2019/0339821 A1 | 11/2019 | Vajjala | |
| 2020/0007554 A1 * | 1/2020 | Vincent | G06F 21/31 |
| 2020/0034764 A1 | 1/2020 | Panuganty | |
| 2020/0067789 A1 | 2/2020 | Khuti et al. | |
| 2020/0097920 A1 | 3/2020 | Doctor | |
| 2020/0104401 A1 | 4/2020 | Burnett et al. | |
| 2020/0104402 A1 | 4/2020 | Burnett et al. | |
| 2020/0151836 A1 | 5/2020 | Lingras et al. | |
| 2020/0160458 A1 | 5/2020 | Bodin | |
| 2020/0162917 A1 | 5/2020 | Anantha et al. | |
| 2020/0202271 A1 | 6/2020 | Brannon et al. | |
| 2020/0210647 A1 | 7/2020 | Panuganty et al. | |
| 2020/0218432 A1 | 7/2020 | Malhotra | |
| 2020/0233685 A1 | 7/2020 | Petkov et al. | |
| 2020/0234218 A1 | 7/2020 | Salloum et al. | |
| 2020/0342520 A1 | 10/2020 | Pandey | |
| 2020/0344185 A1 | 10/2020 | Singaraju et al. | |
| 2020/0349173 A1 | 11/2020 | Chawla et al. | |
| 2021/0120043 A1 | 4/2021 | Karpovsky | |
| 2021/0160018 A1 | 5/2021 | Han | |
| 2021/0275899 A1 | 9/2021 | Hyodo | |
| 2021/0216381 A1 | 11/2021 | Huang | |
| 2021/0409218 A1 | 12/2021 | Elmenshawy | |
| 2022/0027828 A1 | 1/2022 | Avala et al. | |
| 2023/0078169 A1 | 3/2023 | Urena et al. | |
| 2023/0421567 A1 | 12/2023 | Gaffney et al. | |

OTHER PUBLICATIONS

Sun et al., "Designing a Unified Cloud Log Analytics Platform," 2016 International Conference on Collaboration Technologies and Systems (CTS), Orlando, FL, 2016, pp. 257-266, doi: 10.1109/CTS.2016.0057.

Kilgore et al., "A Precision Information Environment (PIE) for emergency responders: Providing collaborative manipulation, role-tailored visualization, and integrated access to heterogeneous data," 2013 IEEE International Conference on Technologies for Homeland Security, 2013, 6 pages.

Yu et al., "Distributed Big Data Analytics in Service Computing," 2017 IEEE 13th International Symposium on Autonomous Decentralized System (ISADS), Bangkok, 2017, pp. 55-60, doi: 10.1109/ISADS.2017.17.

Czajkowski et al., "ERMrest: An Entity-relationship Data Storage Service for Web-based, Data-oriented Collaboration," Oct. 19, 2016, 12 pages.

* cited by examiner

SYSTEMS AND METHODS FOR PROVIDING SECURE ACCESS TO COLLABORATION ROOMS WITH DYNAMIC TENANCY IN RESPONSE TO AN EVENT

CROSS-REFERENCE TO RELATED APPLICATIONS

This application is a continuation-in-part application of U.S. application Ser. No. 17/939,865, filed on Sep. 7, 2022, titled "Systems and Methods for Providing Collaboration Rooms with Dynamic Tenancy and Role-based Security", which is a continuation of U.S. application Ser. No. 17/476,367, filed on Sep. 15, 2021, now U.S. Pat. No. 11,477,208, titled "Systems and Methods for Providing Collaboration Rooms with Dynamic Tenancy and Role-based Security", all of which are hereby incorporated by reference herein in their entireties, including all references and appendices cited therein, for all purposes, as if fully set forth herein. This application is also related to U.S. application Ser. No. 16/940,272, filed on Jul. 27, 2020, titled "Cloud-Based Multi-Tenancy Computing Systems and Methods for Providing Response Control and Analytics", which is hereby incorporated by reference herein in its entirety, including all references and appendices cited therein, for all purposes, as if fully set forth herein. This application is related to U.S. application Ser. No. 17/477,384, filed on Sep. 16, 2021, titled "Systems and Methods for Dynamically Establishing and Managing Tenancy Using Templates", which is hereby incorporated by reference herein in its entirety, including all references and appendices cited therein, for all purposes, as if fully set forth herein.

FIELD OF THE PRESENT TECHNOLOGY

The present disclosure pertains to systems and methods for creating and managing the use of digital or virtual collaboration rooms.

SUMMARY

Some embodiments of the present disclosure are directed to a method comprising establishing a digital collaboration room for an entity, the digital collaboration room is configured to allow users to perform actions on data obtained from a database and placed into the digital collaboration room; generating a token for a first user; receiving a request to perform an action on a portion of the data; performing a hierarchical permissions analysis to: determine if the first user has permission to perform the action and access the portion of the data; and determine if the user currently has permission to enter the digital collaboration room; and retrieving the portion of the data from the database for the digital collaboration room and allowing the first user to perform the action when the user currently has permission to enter the digital collaboration room and the user has permission to perform the action and access the portion of the data.

Some embodiments of the present disclosure are directed to a method comprising receiving a request from a user for data in a digital collaboration room; performing a hierarchical permissions analysis that includes: determining a dependency ordering of one or more actions related to the data; determining if the user has permission to perform each of the one or more actions, in a bottom-to-top manner based on the dependency ordering; and determining if the user currently has permission to enter the digital collaboration room based on an access right; and retrieving the data from a database for the digital collaboration room when the hierarchical permissions analysis is complete.

Some embodiments of the present disclosure are directed to a system comprising a processor and memory for storing executable instructions, the processor executing the instructions to: provide a plurality of digital collaboration rooms for a plurality of entities; allow entities to issue tokens to users to access the plurality of digital collaboration rooms and obtain data from a database; and allow access to the plurality of digital collaboration rooms to the users, where each user is issued one of the tokens, where each of the tokens comprises a tenant identifier, a digital collaboration room identifier, and a role with a set of permissions, the user being allowed to access any of the plurality of digital collaboration rooms for which the user possesses a token of the tokens, the user being allowed to perform one or more actions related to the data based on the set of permissions of the role associated with the token.

Some embodiments of the present disclosure are directed to a method comprising providing a plurality of digital collaboration rooms for a plurality of entities; allowing entities to issue tokens to users to access the plurality of digital collaboration rooms; allowing access to the plurality of digital collaboration rooms to the users, where each user has been issued one of the tokens, where each of the tokens comprises a tenant identifier that identifies one of the plurality of entities, a digital collaboration room identifier, and a role with a set of permissions, the user being allowed to access any of the plurality of digital collaboration rooms for which the user possesses a token of the tokens; allowing the entities to dynamically modify the set of permissions of the role in real-time; receiving a request for data and to perform one or more actions related to the data; performing a hierarchical permissions analysis for the request that includes: determining a dependency ordering of the one or more actions related to the data; determining if the user has permission to perform each of the one or more actions as specified in the token, in a bottom-to-top manner, based on the dependency ordering; and determining if the user currently has permission to enter the digital collaboration room based on an access right in the token; and based on success of the hierarchical permissions analysis: obtaining the data from a database; and allowing the one or more actions to be performed on the data.

Furthermore, systems and methods for providing secure access to a digital collaboration room with dynamic tenancy in response to an event are disclosed. An exemplary method includes establishing, via an orchestration service, a digital collaboration room for an entity, the entity having control to grant permissions to the users regarding the digital collaboration room and to dynamically modify permissions of the users in real time, the orchestration service being a cloud resource where the digital collaboration room, owned by the entity, is hosted and made accessible to the users; receiving and storing three or more authentication factors of a user, the three or more authentication factors including a first authentication factor relating a corporate email account of the user assigned by the entity, a second authentication factor and a third authentication factor; and upon an entity's request and in response to an event: activating an isolate mode and isolating the digital collaboration room; when user input of the first authentication factor of the user is received, granting access of the digital collaboration room to the user; and when user input is received, indicating that the first authentication factor has been forgotten: invalidating the first authentication factor of the user, generating and sending, via the second authentication factor, a notification to the user that the first authentication factor has been invalidated and that the user must use a third authentication factor instead, generating and providing, based on the third authentication factor, a message with a link to the digital collaboration room; and when the user accesses the link utilizing the third authentication factor, granting access of the digital collaboration room to the user.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Overview

Figure 1:
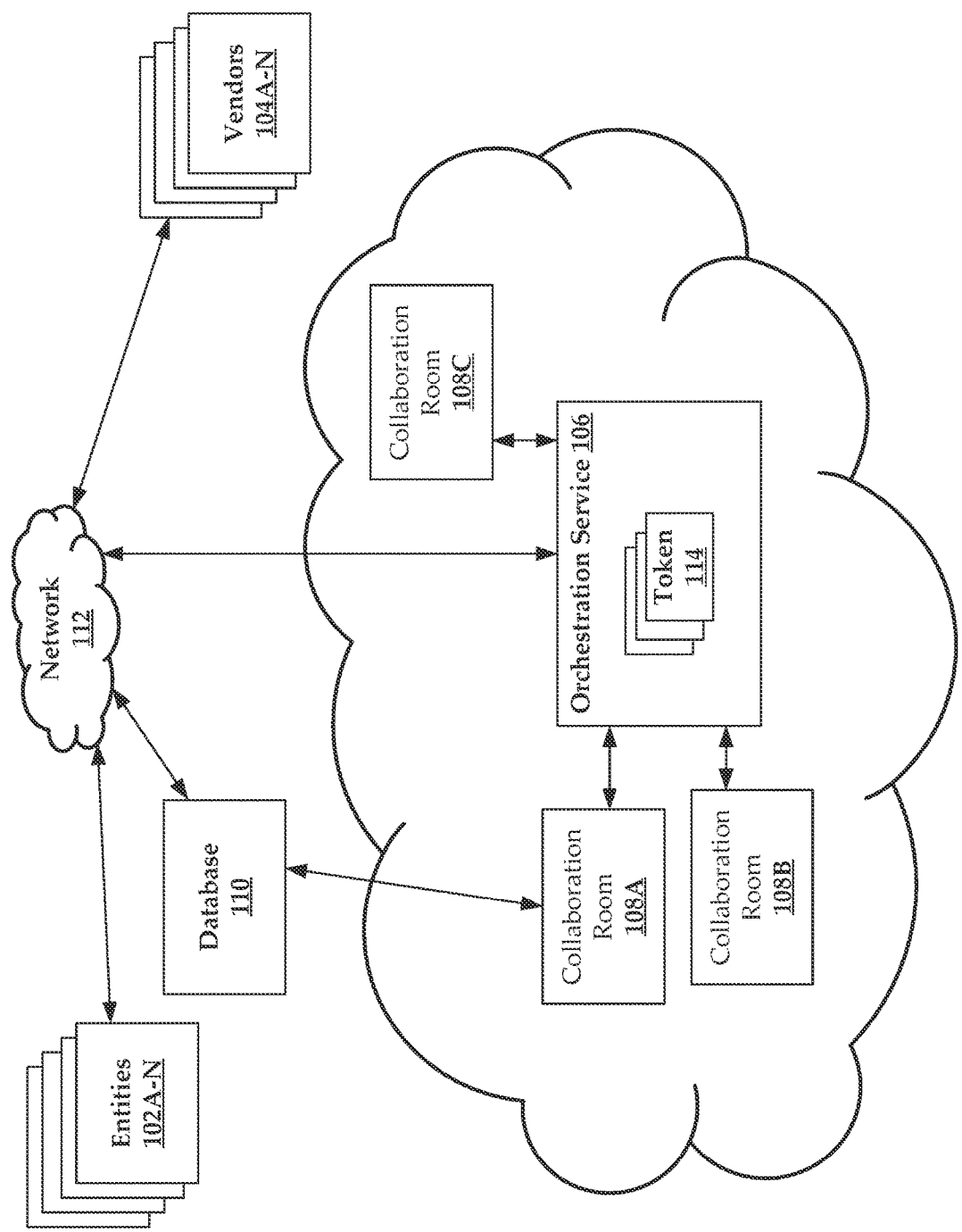
FIG. 1 depicts an example architecture where the systems and methods of the present disclosure can be implemented.

Broadly, the present disclosure is directed to systems and methods for establishing and managing digital collaboration rooms. A plurality of digital collaboration rooms can be established for a plurality of entities, such as companies. A collaboration room can be established to allow users to access data pertaining to an event, such as a lawsuit or a data breach. Users may be associated with the entity or a vendor who may assist the entity with respect to the event. For example, a vendor can include a law firm, a lawyer, privacy counsel, technology consulting, credit monitoring, brokers, public relations, insurance, and notification services—just to name a few. While some embodiments involve creating a collaboration room or other similar virtual collaboration environment based on an event, such spaces can be created for purposes of group collaboration without being connected to or initiated by an event.

The systems and methods provide an orchestration service where entities can maintain collaboration rooms. The orchestration service can also include vendor accounts or profiles. Entities can select vendors to invite to their collaboration room(s). Vendors can access the collaboration room(s) of one or more entities through the orchestration service, and access data depending on their particular permissions or rights granted to them by the entity.

In some instances, many users may need to access data inside the collaboration room and each of these users may have different permissions with respect to the data. The systems and methods can maintain roles that specify the permissions for each user. In one embodiment, the permissions can be modified, resulting in real-time or near-real-time changes to the role of the user. Indeed, the entity is provided with complete control of users that are allowed to enter the collaboration room, as well as what actions the users are allowed to perform on the data inside the collaboration room. In some instances, the permissions for the user, as well as what collaboration rooms they can enter can be encoded into a token.

The systems and methods can perform a hierarchical permissions analysis as users request actions within a collaboration room. In some instances, each time a user performs an action inside the collaboration room, such as refreshing, view, edit, delete, or other similar actions, a hierarchical permissions analysis is executed to determine if the user has permission to perform the requested action, as well as if the user has access rights to be in the collaboration room. This hierarchical permissions analysis can be used to effectuate the dynamic tenancy aspects disclosed herein, as will be discussed in greater detail herein.

Also, in some configurations, the systems and methods may obtain data from a database and allow actions to be performed on the data inside the collaboration room. These data are not maintained in a cache or preserved locally. Thus, access to the data is controlled and actions can only be performed on the data in the collaboration room by an authorized user.

Example Embodiments

FIG. 1 illustrates an example architecture where aspects of the present disclosure can be performed. The architecture may include a plurality of entities, such as entities 102A-N, a plurality of vendors, such as vendors 104A-N, and an orchestration service 106. These components can communicate with one another over a network 112. In general, the architecture creates a global network of users, both entity-related and vendor-related, who can access digital collaboration rooms. Vendors or service providers can publish service-related information. The orchestration service can allow the vendors to be selectable by the plurality of entities.

The entities can also request the creation of collaboration rooms. For example, entity 102A can establish collaboration rooms 108A and 108B, while another entity can establish collaboration room 108C. Entities can control when and how vendors access these collaboration rooms, as well as what kinds of actions the users can perform against data obtained from a database 110. As will be discussed herein, data can be pulled from the database 110 on an as-needed basis. In some embodiments, data does not persist in a collaboration room beyond a session with one or more vendors.

The network 112 can include combinations of networks that enable the components in the architecture to communicate with one another. The network 112 may include any one or a combination of multiple different types of networks, such as cellular, cable, the Internet, wireless networks, and other private and/or public networks. In some instances, the network 112 may include Wi-Fi or Wi-Fi direct. The network 112 can include short-range or radiofrequency links such as BLUETOOTH or ultra-wideband (UWB).

The orchestration service 106 can allow an entity to establish a collaboration room. The digital collaboration room can be configured to allow users to perform actions on data obtained from a database and placed into the digital collaboration room. For example, entity 102A can establish collaboration rooms 108A and 108B, where collaboration room 108A pertains to a first event, such as a cybersecurity breach, and collaboration room 108B, which pertains to a ransomware event. In general, collaboration rooms can be created in response to an incident or event (although in some instances rooms are not created in response to an event, but simply to allow users to collaborate). The orchestration service 106 can assign each entity a tenant identifier. The orchestration service 106 can assign each collaboration room a digital collaboration room identifier.

There are two types of users on the entity side (additional roles can also be specified). For example, entity users can have an administrator role or a participant role. These users are typically employees who help the entity navigate an event. The entity can invite any of the vendors to access a particular collaboration room.

When an entity chooses a vendor from the global network of users, the orchestration service 106 can generate a token 114 for the vendor user. The token 114 can embed a set of long-lived credentials that allow a user to perform an action on data with respect to a tenant (specified by a tenant ID), for a particular collaboration room (specified by a digital collaboration room ID). By long-lived, this means that privileges/permissions can persist until revoked by a user who has the right to revoke permissions. It will be understood that some privileges or credentials can be short-lived as well. For example, some privileges or credentials can be set to expire after a period of time or after a certain number of uses. A user could be allowed to view a document a set number of times, or until the expiration of a date in the future.

Also, when vendor users have been granted access to collaboration rooms of various entities, the orchestration service 106 can allow vendors to enter and exit collaboration rooms as needed. The orchestration service 106 effectively functions as a cloud resource where collaboration rooms, owned by entities, can be hosted and made accessible to vendors.

The token 114 can include any one or more of a tenant identifier, a digital collaboration room identifier, an access right for the user to enter the digital collaboration room, and a role for the user. Generally speaking, the role specifies a set of permissions that indicate actions that can be performed by the user within the collaboration room. For example, a user who is a lawyer may be given a first set of permissions, whereas an insurance broker may be given a second set of permissions. The lawyer may be allowed to access and view any type of document, while the insurance broker may be allowed to access and view only data related to an insurance claim.

While some examples include roles that can be assigned on an individual user level, the orchestration service 106 also allows for the creation of higher-level user roles. For example, a general law firm role can be established which allows any user in the law firm to perform certain actions in the collaboration room.

The orchestration service 106 allows entities to specify what permissions are created for given roles. For example, a lawyer role can include a role with a set of permissions that allows the user to view all data, as well as other actions such as edit, delete, move, and so forth. Again, the orchestration service 106 allows actions to be performed on data placed in a collaboration room. The actions can include, but are not limited to read, view, write, filter, edit, and so forth. For each action, there is a specific and defined permission that can be grated and encoded into a token for the user. In some instances, the permissions are selected by an administrative user of the entity which owns the digital collaboration room.

Additionally, the orchestration service 106 can allow entity administrator users the ability to set visibility of actions within the collaboration room. For example, the administrator may allow all users to see all actions that can be conducted in the collaboration room. In another embodiment, only users internal to an entity can view the actions that are available in the collaboration room. In yet another example, only people listed in a lead of the user section may be allowed to view actions in the collaboration room. For example, a head lawyer or technical specialist may be allowed to view actions, while others on their team may not. In sum, a user may have all or limited view into actions available in the collaboration room.

In some instances, the orchestration service 106 can email a requested vendor a link. The user can click the link to enter the digital collaboration room. For example, the vendor 104A can enter the collaboration room 108A of entity 102A. The orchestration service 106 can evaluate the token of the user to determine if they have permission to enter the collaboration room 108A. In some instances, the token can be linked to a session policy for the user. That is, the actions of the user can be managed on a session-by-session basis.

Once the user enters collaboration room 108A, the user can perform an action on data obtained from the database 110. For example, the vendor may request to view emails regarding a particular topic. In some instances, the orchestration service 106 can provide a query interface where the vendor can query for documents or other data using drop-down boxes, fields, or other input mechanisms.

If there are data responsive to the query, these data can be obtained from the database 110 and made available in the collaboration room 108A. The user can then be allowed to perform one or more actions against the data, assuming the user has permissions for such actions. Thus, the orchestration service 106 can be configured to receive a request to perform an action on a portion of the data. That is, in some instances, the user can perform an action on all or a portion of the data included in the database 110.

The orchestration service 106 can maintain dynamic tenancy within the architecture. Dynamic tenancy allows for the permissions/role of a user to be updated at any time and to have these modifications to the permissions/role become effective in real-time or near-real-time. These changes in permissions/role for a user can occur even in instances where the user is active in the collaboration room. An administrator user for an entity can change the permissions for a vendor user at any time. For example, the permissions/role for a lawyer can be changed. The permissions may initially allow the lawyer to access all data/documents for the entity related to the incident or event associated with the collaboration room. Changes in these permissions may result in the lawyer being allowed to access only a portion of the data due to an identified conflict. In another example, a lawyer can be completely excluded as well, based on an identified conflict. While examples herein contemplate the entity having administrators that can change permissions, some vendor roles may also be allowed to edit permissions for subordinate vendor users. For example, a managing partner of a law firm can manage permissions assigned to individual lawyers in their firm.

As noted above, these permissions can be changed and effectuated in real-time. By way of example, when a user is in the collaboration room viewing documents, the user's permissions to view certain documents may be revoked. When the user attempts to refresh their view or open a document, the user will be blocked when the requested documents are in the portion of the data for which the permissions of the user have been revoked. The user can continue to operate in the collaboration room and perform other actions for which they have permission.

In some instances, the orchestration service 106 enables aspects of dynamic tenancy by performing continual permissions checks or analyses on users in the collaboration room. The orchestration service 106 can perform permissions checks any time a user performs or requests the performance of an action in the collaboration room. This can include actions such as refreshing a view of the collaboration room. In general, any behavior of a user in a collaboration room can be considered an action. Thus, an action is requested each time the user performs a refresh of the data in the digital collaboration room, or other similar actions.

For example, a user currently viewing a document may have their permission to view that document revoked. If the user refreshes their view or requests an action related to the document, access to that document can be revoked such that the user can no longer view or perform actions against that document. Again, as noted above, this can occur on a session-by-session basis, where permissions can be authorized for a session, and the permissions are rechecked in a subsequent session. Changes between sessions to the permissions can result in an alteration of user rights. In sum, an entity user or other authorized user can change the set of permissions which dynamically changes the role of the user, at any time.

To enable this dynamic tenancy and dynamic provision of permissions, the orchestration service 106 can be configured to perform a hierarchical permissions analysis. The hierarchical permissions analysis is a bottom-to-top permissions analysis that determines user who has requested an action has the requisite permission or right to perform the requested action. In some instances, the user can submit a request that requires more than one action. For example, a request to edit a document may include initially a request to obtain the document from the database, along with another request to allow the user to view the document, and finally a request to edit the document. Each of these requests may have a first permission associated therewith. The request to obtain could have a first permission, the request to view have a second permission, and the request to edit may have a third permission. In general, the third permission can depend on the user having the second permission, and the second permission can depend on the user having the first permission. This creates what is referred to as a dependency ordering of one or more actions.

Figure 2:
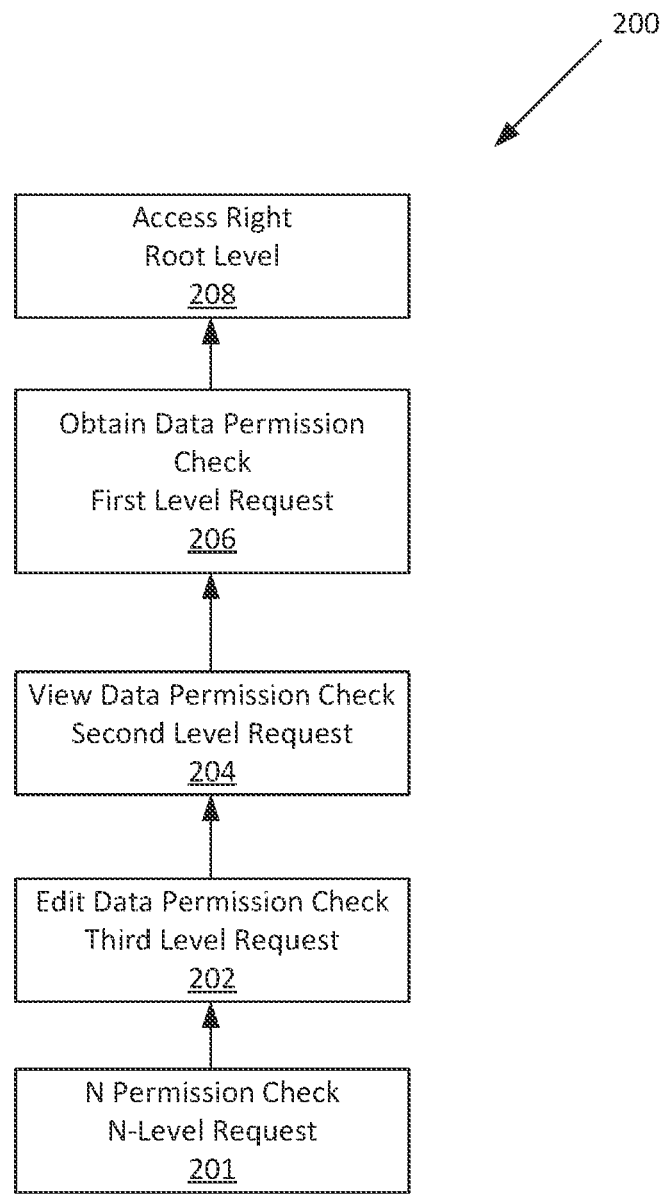
FIG. 2 illustrates an example tree structure for use in a hierarchical permissions analysis.

Referring now to FIGS. 1 and 2 collectively, generally, when more than one action is requested in a session, the actions can be considered as a tree structure 200. In one example, each of the one or more actions can be arranged into branches of a tree structure based on the dependency ordering. A third action would be on bottom level 202 of the tree structure, with the second action on a second level 204 above the third level, and the first action on a first level 206 above the second. A root level 208 of the tree structure can be the access right to the digital collaboration room. In general, each of the one or more actions are arranged into branches of a tree structure based on the dependency ordering, with the access right to the digital collaboration room being a root of the tree structure. While three levels have been shown, any N-number of levels of requests and permissions checks can be present (see 201 of FIG. 2).

In one example, an action or transaction can include either a read or write operation. To write, a user should possess permission to read and/or write from the bottom to the top of a tree structure. To read, a user should possess permission to read from the bottom to the top of a tree structure.

The orchestration service 106 can be configured to determine a dependency ordering of one or more actions related to the data. The hierarchical permissions analysis can include determining if the user has permission to perform each of the one or more actions, in a bottom-to-top manner based on the dependency ordering. Thus, when the user requests the third action of editing the document, the orchestration service 106 can determine if the user has permission to edit the document. Also, the orchestration service 106 also determines if the user has permission to view the document (second action), as well as permission to obtain the document (first permission). Finally, the orchestration service 106 also determines if the user currently has permission to enter the digital collaboration room.

These permissions checks occur in a layered fashion as well. For example, the user may first request only to obtain the document. A permissions check is then performed to ensure the user has the right to obtain the document. When the user then requests to open/view the document, the orchestration service 106 not only determines if they have permission to open/view the document, but the orchestration service 106 can again verify that the user has permission to obtain the document. The orchestration service 106 can also verify that the user currently has rights to be in the collaboration room at each separate permissions check. Thus, the orchestration service 106 can iteratively and/or recursively check for permissions at each level of the dependency ordering.

Again, these permissions checks are performed by the orchestration service 106 to ensure that none of the permissions have changed or been modified. For example, if the right of the user has been revoked to view the document, the user also cannot be allowed to edit the document. If the right of the user has been revoked to obtain the document, the user also cannot be allowed to view or edit the document. It will be understood that the user may still have rights to enter the digital collaboration room and conduct other actions. However, if the access rights of the user to enter the collaboration room have been revoked, the user can perform no actions.

The orchestration service 106 can deny access to all or a portion of the data when the role has been altered and the first user no longer has rights to perform the action. The orchestration service 106 can deny access to perform the action on the data when a permission of a set of permissions has been revoked but the user currently has permission to be in the digital collaboration room. In this example, the user can still be in the collaboration room and potentially be assigned other permissions. As noted above, this hierarchical permissions analysis can be executed each time a user performs any action inside the collaboration room. Also, the hierarchical permissions analysis is performed against the permissions in the token for the user. That is, the orchestration service 106 can convert the permissions into a set of rules that are run over data pulled from the database 110.

Assuming the user request passes the hierarchical permissions analysis, the orchestration service 106 can obtain data from a database and allow the one or more requested actions to be performed on the data.

In some embodiments, a tenant can be associated with one or more vaults (e.g., databases) that store data that can be used in a collaboration. A user can be associated with the tenant. The user can have a specified role, such as a provider/vendor role, a provider/administrator role, and/or a client role. These roles pertain to a collaboration room. A user can have vault roles as well, such as administrator role, a user role, and/or a vendor role. Thus, multiple users can have access to data in the vault. Each user can be allowed to perform one or more actions in a collaboration room related to data obtained from the vault inside the collaboration room.

A task can have n-number of associated tasks, messages, and/or facts. The user and data can have one or more visibility rules applied thereto. Example visibility rules can include, but are not limited to, allowing all users in the collaboration room to view data obtained from the vault, only allowing users internal to the entity to view data, and/or custom confidential users or organizations which can be explicitly added.

Figure 3:
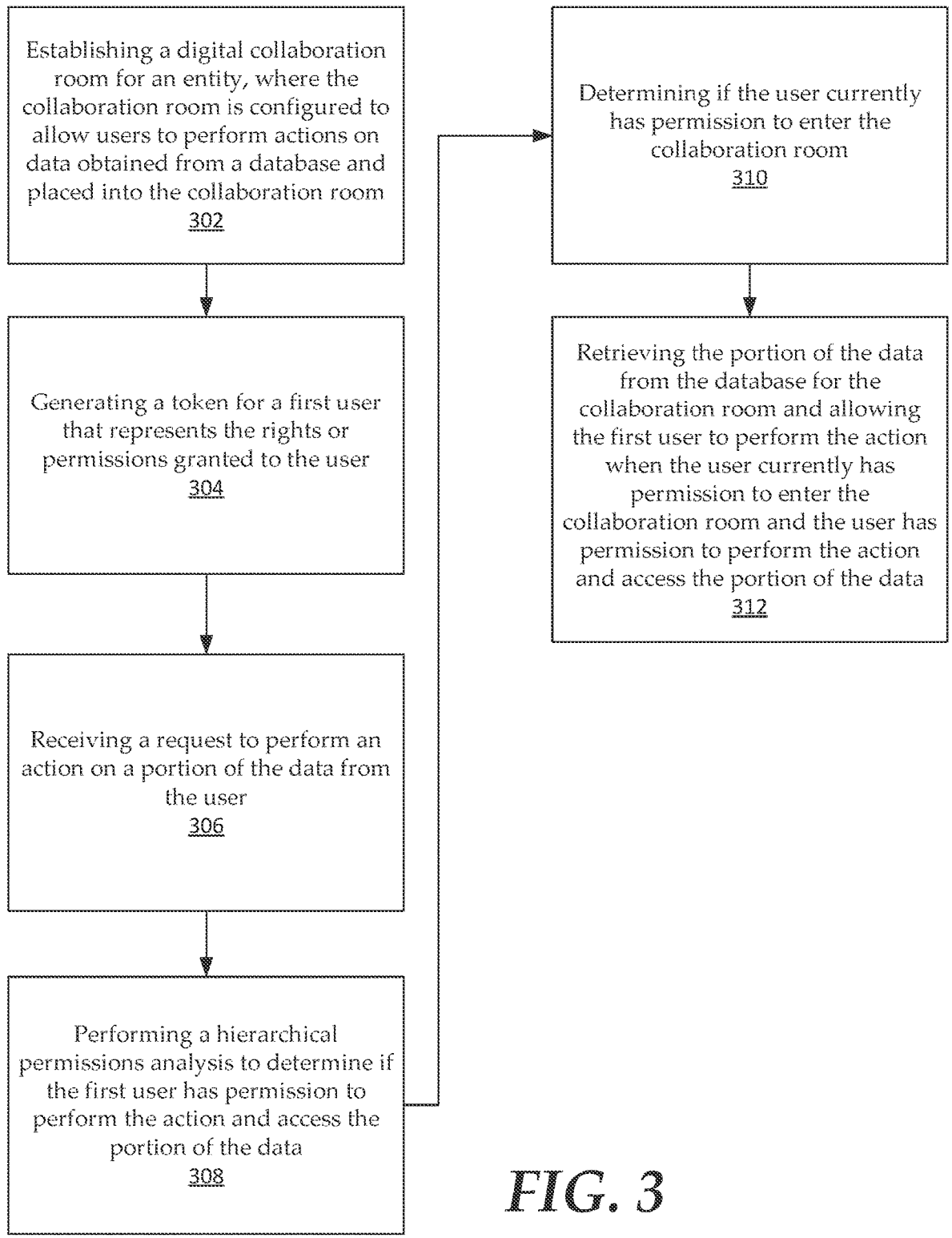
FIG. 3 is a flowchart of an example method of the present disclosure.

FIG. 3 is a flowchart of an example method of the present disclosure. The method can include a step 302 of establishing a digital collaboration room for an entity, where the digital collaboration room being configured to allow users to perform actions on data obtained from a database and placed into the digital collaboration room. In some instances, the entity and collaboration room are each given a unique ID.

Next, the method includes a step 304 of generating a token for a first user that represents the rights or permissions granted to the user. Generating the token may include encoding a tenant identifier, a digital collaboration room identifier, an access right for the first user to enter the digital collaboration room, and a role for the first user. To be sure, the role specifies a first set of permissions that indicate actions that can be performed by the first user.

Steps 302 and 304 can be performed for additional users. That is, a plurality of users can be granted tokens and corresponding permissions related to the collaboration room.

The method can include a step 306 of receiving a request to perform an action on a portion of the data from the user. For example, the user can submit a query to identify documents that are relevant to one or more keywords.

The method also includes a step 308 of performing a hierarchical permissions analysis to determine if the first user has permission to perform the action and access the portion of the data. The hierarchical permissions analysis can also include a step 310 of determining if the user currently has permission to enter the digital collaboration room. As noted above, this can include evaluating an access right included in the token for the user.

Assuming that the permissions analysis is successful, the method can include a step 312 of retrieving the portion of the data from the database for the digital collaboration room and allowing the first user to perform the action when the user currently has permission to enter the digital collaboration room and the user has permission to perform the action and access the portion of the data. If the permissions analysis is unsuccessful, the user can be presented with a message informing them that they lack permission to perform the requested action.

In some instances, the method can include specifying a role for the first user that includes a first set of permissions.

The method can also include altering the first set of permissions and denying access to the portion of the data when the role has been altered and the first user no longer has rights to perform the action. Access to perform the action on the portion of the data can also be denied when a permission of the first set of permissions to perform the action has been revoked but the user currently has permission to be in the digital collaboration room. Thus, the access right may be intact and granted while permissions for dependent actions may be active or revoked.

Figure 4:
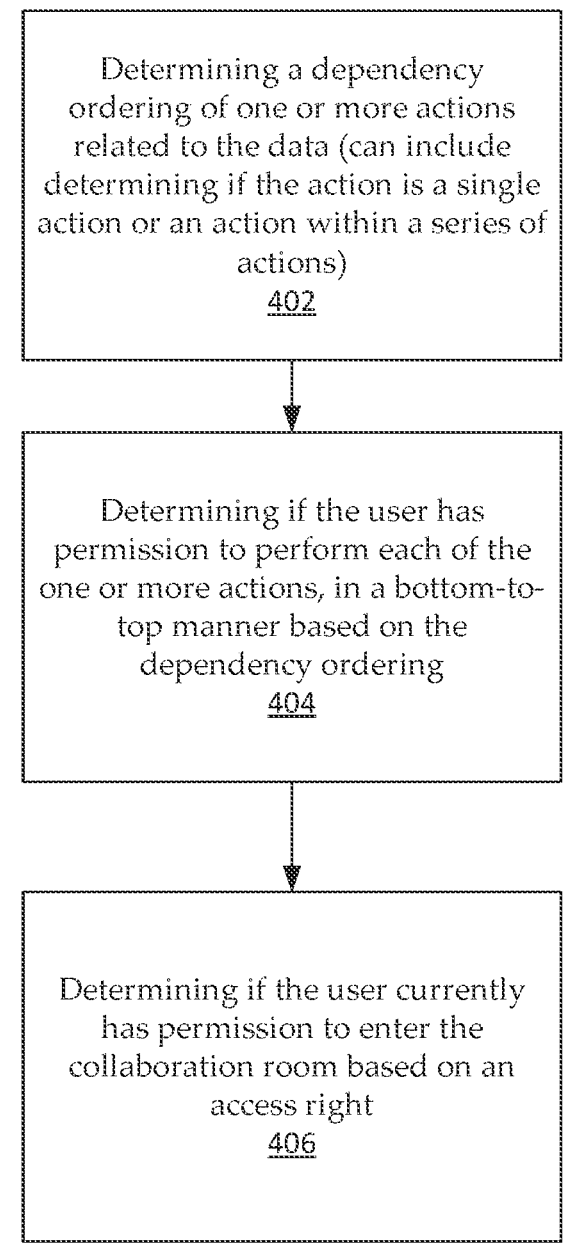
FIG. 4 is a flowchart of an example method of the present disclosure related to an example hierarchical permissions analysis.

FIG. 4 is a flowchart of another example method for performing a hierarchical permissions analysis that includes a step 402 of determining a dependency ordering of one or more actions related to the data. This can include determining if the action is a single action or an action within a series of actions. When more than one action is occurring or has been requested, the method can include a step 404 of determining if the user has permission to perform each of the one or more actions, in a bottom-to-top manner (e.g., iteratively or recursively) based on the dependency ordering. Next, the method includes a step 406 of determining if the user currently has permission to enter the digital collaboration room based on an access right.

Figure 5:
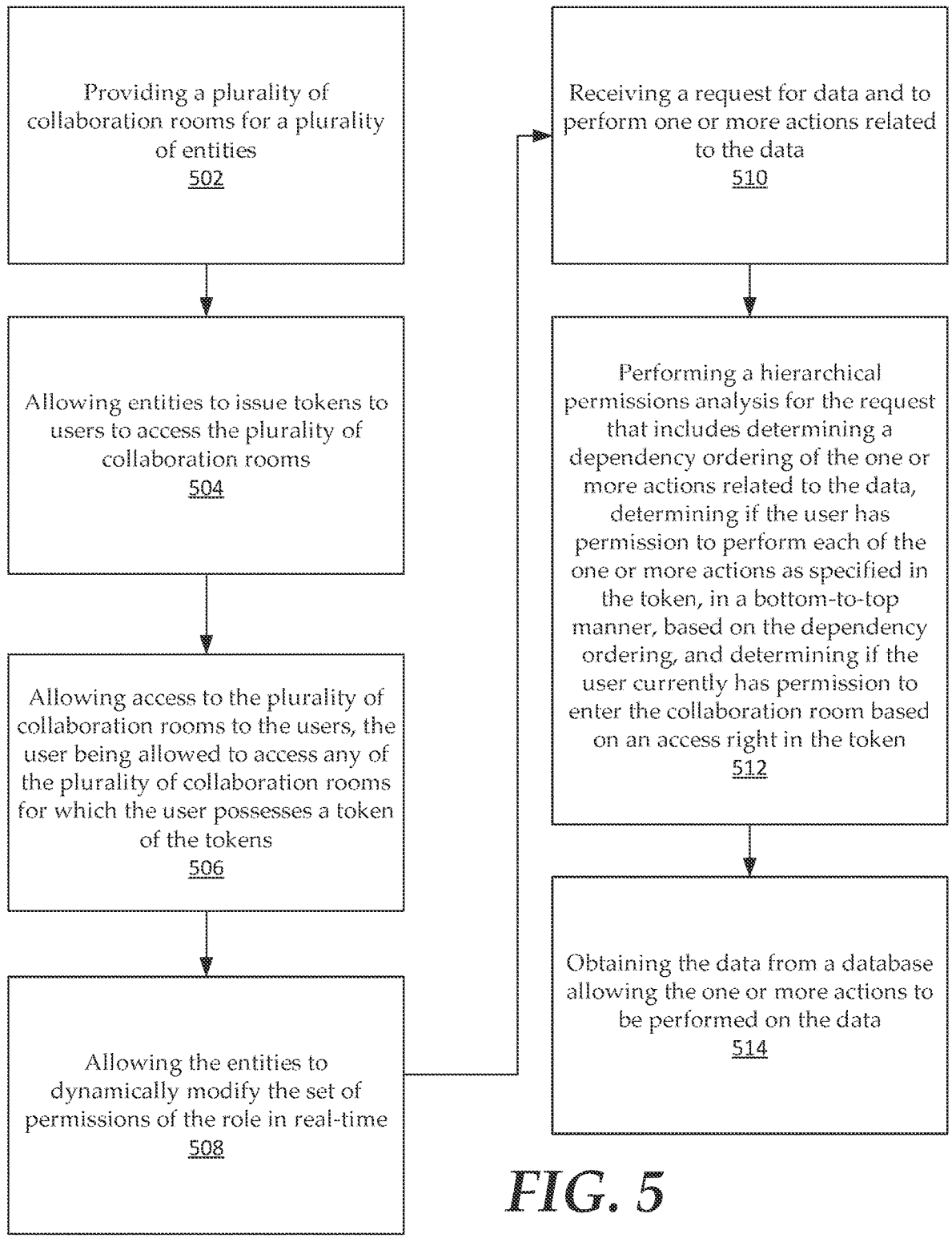
FIG. 5 is a flowchart of an example method of the present disclosure.

FIG. 5 is a flowchart of another example method of the present disclosure. The method can include a step 502 of providing a plurality of digital collaboration rooms for a plurality of entities. The method can also include a step 504 of allowing entities to issue tokens to users to access the plurality of digital collaboration rooms. Each user has been issued one of the tokens and each of the tokens comprises a tenant identifier that identifies one of the plurality of entities, a digital collaboration room identifier, and a role with a set of permissions.

The method includes a step 506 of allowing access to the plurality of digital collaboration rooms to the users, the user being allowed to access any of the plurality of digital collaboration rooms for which the user possesses a token of the tokens. Next, the method includes a step 508 of allowing the entities to dynamically modify the set of permissions of the role in real-time, as well as a step 510 of receiving a request for data and to perform one or more actions related to the data.

In some instances, the method can include a step 512 of performing a hierarchical permissions analysis for the request that includes determining a dependency ordering of the one or more actions related to the data, determining if the user has permission to perform each of the one or more actions as specified in the token, in a bottom-to-top manner, based on the dependency ordering, and determining if the user currently has permission to enter the digital collaboration room based on an access right in the token. Based on success of the hierarchical permissions analysis, the method includes a step 514 of obtaining the data from a database allowing the one or more actions to be performed on the data.

Figure 6:
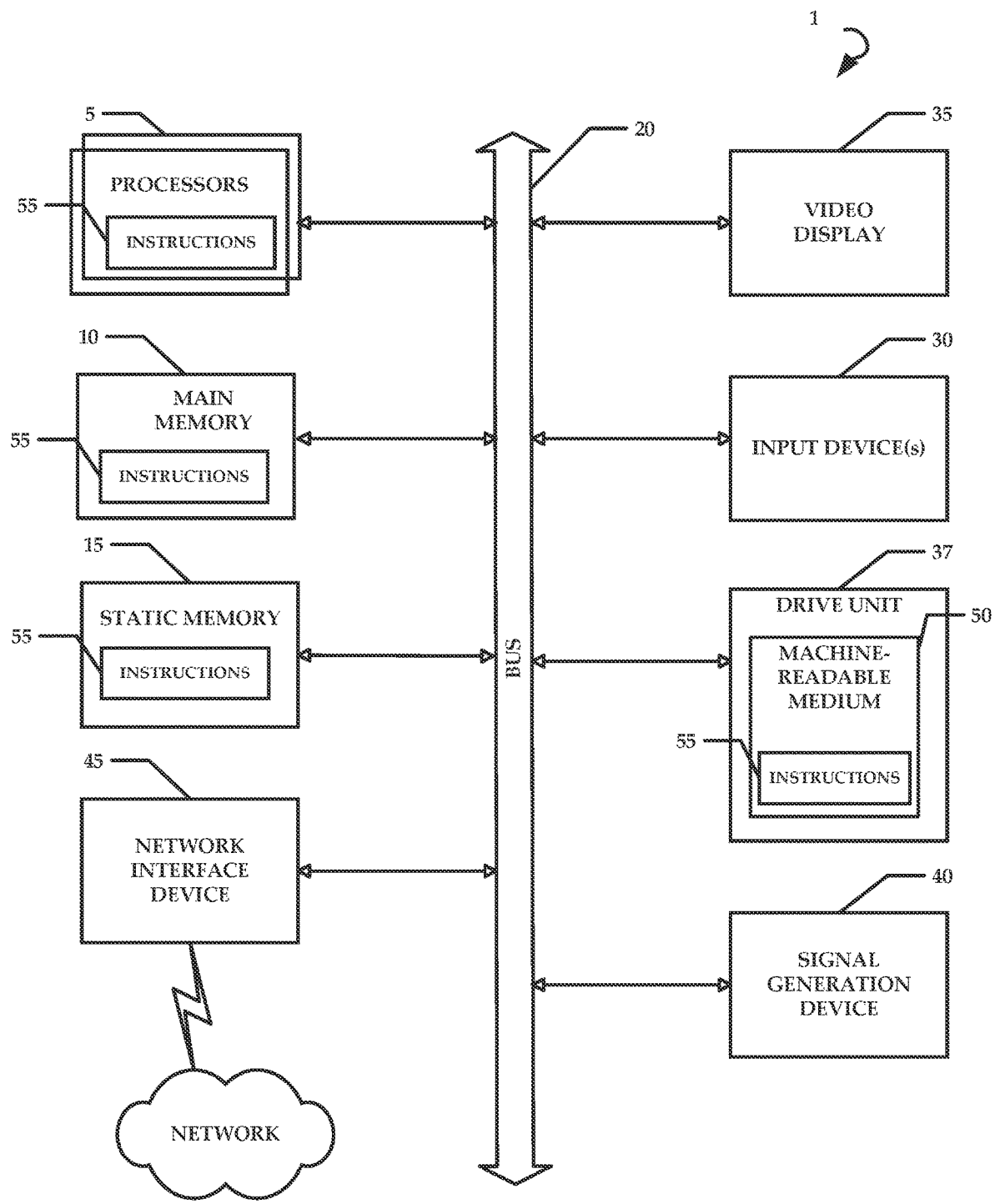
FIG. 6 is a schematic diagram of a computing system that is used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described herein, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

Isolate Mode

As previously described, the present disclosure provides systems and methods for providing secure access to collaborations rooms with dynamic tenancy, even during or following an event or a crisis. As described above, a collaboration room can be established to allow users to access data pertaining to an event, such as a lawsuit or a data breach. Users may be associated with the entity or a vendor who may assist the entity with respect to the event. For example, a vendor (also at times called a "vendor user") can include a law firm, a lawyer, privacy counsel, technology consulting, credit monitoring, brokers, public relations, insurance, and notification services—just to name a few. Also, as mentioned earlier herein, at least two roles of users on the entity side. The entity user can have an administrator role or a participant role. These entity users are typically employees who help the entity navigate an event.

Broadly speaking, when an entity (such as a company) is not experiencing an event (e.g., a cyberattack, a cyber incident, or any other type of adverse issue or crisis), the entity is considered to be in normal operations or in the period of "peace time", since the entity is not embattled, and the entity is not dealing with outside adverse situations or attackers who wish to wrongfully gain access to the entity. During this period of peace time, the entity tenant typically wants to integrate all of their enterprise pieces and tools that are within their entity ecosystem to their corporate tools, thereby allowing the entity's users to have access to the entity's corporate tools via their corporate work email.

As described above, the entity can have entity users (such as company employees, administrators, and the like) and vendor users. Entity users can gain access to the entity's corporate tools by logging into their work email. By using integrations to couple an entity's enterprise pieces and corporate tools with each other, within the entity ecosystem, such corporate tools may automatically be provisioned and de-provisioned for users. Thus, the entity may invite the entity users to gain access to the entity's corporate tools by way of their corporate or company work email.

However, during or following an event or crisis, the entity is considered to be in "war time," since the entity is actively defending itself and/or the entity is aggressively working to address the event and return to normal operations (that is, return to "peace time"). In other embodiments, the entity is considered to be in "war time" if the entity is running a simulation or having a practice or training session using the platform including the orchestration service and/or the digital collaboration room of the entity. After an event occurs, if the entity meets its goal to integrate all the enterprise pieces with its corporate tools, such an integration may become a liability, especially in the case where the corporate email of the entity is compromised. If the entity's corporate email is compromised, then an attacker (that started the event) can spread their unwanted influence over the entity's various corporate tools. For instance, a hacker engaged in a cyber-attack against the entity may hack into the corporate email or may attempt to gain access to the entity's secure place (such as the entity's digital collaboration room) during a cyber incident by using a "forgot password" flow. In other words, the hacker will pose as an entity user (such as an employee) and try to infiltrate the entity's secure place of data, by trying to log into the entity through the corporate email but indicating upon login that they "forgot" their username and/or password by clicking on a "forgot password" button and the like. Thus, the present disclosure is flexible and responsive, regardless of whether the entity is in "peace time"/normal operations or is engaged in "warfare," during or after an event or crisis, such as a cyberattack, a fire, a cyber incident, a data breach, and the like. When the entity/tenant is in "peace time," the present disclosure allows for user access and registration of users, so that the users may seamlessly access an entity's collaboration rooms with dynamic tenancy. During user registration, the system gathers at least three authentication factors for each user. Authentication factors include, but are not limited to, push notifications to registered devices, software tokens, hardware tokens, recovery codes, passkeys and the like. In exemplary embodiments, the three authentication factors for a user are: (1) the user's corporate email address and password for accessing the entity (sometimes referred to as a first authentication factor); (2) the user's backup email address (sometimes referred to as a second authentication factor); and (3) multifactor authentication (sometimes referred to as a third authentication factor). It will be understood, however, that any type of authentication factor can be used, and that this disclosure is not limited to merely the authentication factors listed herein. In other exemplary embodiments, the second authentication factor includes a phone number of the user (which may be their work phone number or the number of the user's mobile phone) as a primary second authentication factor, as well as the user's backup email which the user may have entered with the orchestration service during the registration process as an alternate second authentication factor in case the phone number of the user fails or is compromised. If the user's backup email is used an alternate second authentication factor, then an email may be generated by the orchestration service and sent to the user's backup email account to indicate when the first authentication factor has been invalidated, instead of sending a text message to the user's phone or mobile number.

The multifactor authentication may require the use of a user's mobile phone number and/or multifactor authentication application. As an example, the multifactor authentication can be a means of authenticating a user by having the user enter a secret code (such as alphanumeric code or a pin number) that is dynamically generated by the multifactor authentication application associated with the entity user's mobile device, so that the user can login to the entity and/or the digital collaboration room using the secret code. Another example is that the multifactor authentication can be a means of authenticating a user by having the user enter a secret code (such as alphanumeric code or a pin number) that is dynamically generated by the multifactor authentication application associated with the entity user's mobile device, so that the user can login their backup email address (which is the second authentication factor) in order to retrieve an email or message generated by the orchestration service, and link on a link in the email or message, in order to gain access to the entity's digital collaboration room.

Also, the present disclosure allows for systems and methods for providing secure access to a digital collaboration room with dynamic tenancy to a user during "war time" or following an event, by completely isolating or separating the system (including, but not limited to the orchestration service and/or the digital collaboration rooms) from the rest of the ecosystem of the entity's corporate tools, as will be described in further detail below. When this isolation occurs, typically triggered by the entity and/or the entity's trusted vendors (as will be described later herein), the orchestration service and/or the digital collaboration rooms are said to be in an "isolate mode." Thus, the systems and methods provided herein provides more security and flexibility in comparison to traditional systems and methods. Furthermore, these system and methods of invalidating the first authentication factor and guiding users to the better, more secure pathway reduces the likelihood that the user will experience confusion, frustration and/or anxiety when the isolate mode has been activated.

Furthermore, the isolate mode for an entity can be activated by either the entity itself at the tenant level or a vendor or trusted partner of the entity. If the entity enables the isolate mode, the entity can do so by communicating this command to the orchestration service. It should be noted that typically, an entity user (like an employee) cannot activate the isolate mode; instead, the isolate mode must be activated by either the entity itself at the entity level (sometimes referred to as the account level or the tenant level) or by one of the entity's vendor/trusted partners. That is, the vendor/trusted partner (like insurance carriers providing fire insurance, attorneys assisting the entity during cyber crisis, or forensic specialists) can activate the isolate mode of the system on behalf of the entity. The vendor/trusted partner can enable or activate the isolate mode of the system, by leveraging and reaching out over the multitenant system to do so. In other words, the vendor user's ability to submit the entity's request to activate the isolate mode is enabled by the dynamic tenancy and dynamic provision of permissions as implemented by the orchestration service, as described earlier herein.

In other embodiments, the entity grants permissions to its entity users (such as an employee) to activate the isolate mode on behalf of the entity. If such permission is granted, an entity user can communicate the command to activate the isolate mode on behalf of the entity to the orchestration service. In those cases, if the entity grants permission to its entity users to submit the entity's request on behalf of the entity, the entity user's ability to submit the entity's request to activate the isolate mode is enabled by the dynamic tenancy and dynamic provision of permissions as implemented by the orchestration service.

However, the entity may only allow account owners in the entity to disable the isolate mode of the entity. In other words, vendors and entity users (such as employees) generally cannot disable the isolate mode of the entity, as the entity has not granted such permissions to vendors and the entity users.

There may be a number of situations when the entity and its entity users may not be able to activate the isolate mode (i.e., they may not be able to "pull" the alarm or lever, following the event or cyberattack) by itself. For instance, in some instances, the entity may not have access to the orchestration service or the digital collaboration room. Other times, the entity lacks the maturity, awareness, or knowledge of the event, that is needed to activate the isolate mode. When an entity and the entity users cannot or will not activate the isolate mode, for whatever reason, the orchestration service allows for the entity's vendor/trusted partner to "pull" the alarm and trigger or activate the isolate mode on behalf of the entity. When the isolate mode is enabled, all integrations and efforts to integrate or otherwise couple with the orchestration service and/or the digital collaboration rooms are severed on multiple levels, and any efforts or attempts of integration made, after the isolate mode is activated, are blocked.

The present disclosure further provides a mechanism for invalidating a previously accepted authentication factor and guiding a user to more secure pathway by using a different authentication factor of handshake. In some embodiments, the present disclosure invalidates a previously valid or previously accepted authentication factor that the user is familiar with using, such as the entity's corporate email (usually in the form of typing in a username and password to access the employee's corporate email). Instead of providing access to the entity's collaboration room via an entity user's corporate email address and password, the system reroutes the entity user to a known backup state using a valid authentication factor or handshake. By invalidating the first authentication factor of using the corporate email, the system ensures that all communications between the entity and its users, through a potentially compromised or hacked corporate email server, is stopped altogether.

Also, it should be noted that since the orchestration service began with receiving and storing three authentication factors for each user, typically upon registration, once an event or crisis occurs, the orchestration service can invalidate one of the three authentication factors, and the orchestration service is still left with two valid authentication factors for each user.

As an example, once an event occurs, because the isolate mode has been activated (that is, the isolate mode is "on"), the user is not automatically blocked. Instead, the user is notified that they can no longer use their corporate email to login to access the entity and the entity's corporate tools and the entity user is rerouted to another pathway. In other words, the orchestration service will try to actively handle the user experience of being rerouted to another pathway.

If the entity user tries logging in using their work email, then the orchestration service will generate a text message or some other communication to the user's mobile phone number, asking the user to login using their backup personal email address (which has been previously registered with the system as the second authentication factor) and a third authentication factor. The orchestration service may provide the user with a hint, as part its text message to the user's mobile phone number, as to what is the user's backup email address that the user provided to the system during the initial registration process. Thus, the orchestration service reroutes the entity user to a better, more secure pathway for gaining access to the entity and the entity's corporate tools. The orchestration service will send an email to the user's backup email account, and the email sent will include an actual login link to the entity. Upon retrieving the system's email using their backup email account, the user can then click on the login link that was sent by the system, and gain access to the digital collaboration room, even though the isolate mode has been enabled. In some embodiments, the orchestration service can evaluate the token of the user to determine if they have permission to enter the collaboration room.

Figure 7:
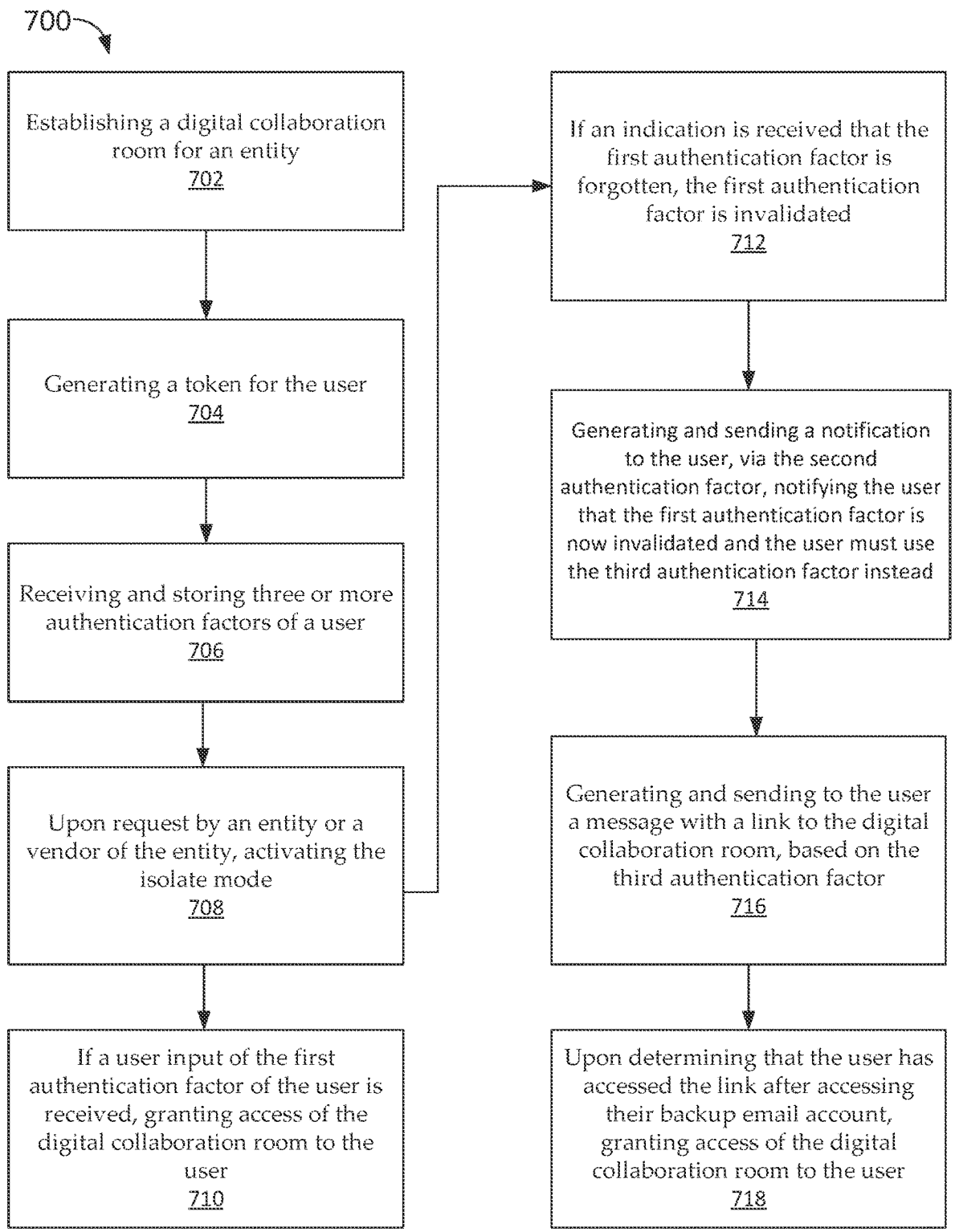
FIG. 7 is a flowchart of an example method of the present disclosure.

FIG. 7 is a flowchart of an example method 700 of the present disclosure. The method 700 can include a step 702 of establishing a digital collaboration room for an entity, where the digital collaboration room being configured to allow users to perform actions on data obtained from a database and placed into the digital collaboration room. In some instances, the entity and collaboration room are each given a unique ID. The digital collaboration room is established via the orchestration service which is a cloud resource where the digital collaboration room, owned by the entity, is hosted and made accessible to the users. The entity has control to grant permissions to the users regarding the digital collaboration room and to dynamically modify permissions of the users in real time. The users may include one or more entity users and, optionally, one or more vendor users.

The method 700 can also include a step 704 of generating a token for the user that represents the rights or permissions granted to the user. Generating the token may include encoding a tenant identifier, a digital collaboration room identifier, an access right for the user to enter the digital collaboration room, and a role for the user. To be sure, the role specifies a first set of permissions that indicate actions that can be performed by the user.

At step 706, the users are registered by the orchestration service. As part of the user registration, three or more authentication factors of the users are received and stored. Three authentication factors for a user can include a first authentication factor, a second authentication factor and a third authentication factor. In certain embodiments, the third authentication factor comprises a multifactor authentication, such as a multiple authentication service application loaded on the user's mobile phone. The multifactor authentication service may generate a secret code, passcode, and/or pin to be entered by the user to access a backup email account of the user.

In some embodiments, the first authentication factor relates to a corporate email account of the user assigned by the entity, the second authentication factor comprises a mobile number of the user, and the third authentication factor relates to a backup email account of the user. In further embodiments, the first authentication factor includes a username and password to login to the corporate email account of the user, which was supplied by the user to the orchestration service, and the third authentication factor relates to the email address of a backup email account that was also provided by the user to the orchestration service during their user registration.

As stated earlier, either the entity or a vendor user of the entity can request and activate an isolate mode in response to an event or incident. At step 708, upon receiving such a request by the entity or a trusted vendor user of the entity, the isolate mode is activated, thereby isolating the orchestration service and/or the digital collaboration room from other aspects, tools, corporates pieces, or services belonging to the entity. In some embodiments, the isolated orchestration service and/or the digital collaboration room are components of the platform that is isolated, removed or otherwise severed from the rest of the entity's ecosystem of corporate tools and services. In other embodiments, activating an isolate mode and isolating the digital collaboration room further comprises severing any and all integrations on multiple levels with the digital collaboration room (such as the integrations of the digital collaborate room with any other portion of the entity's ecosystem), and blocking any further attempts of integrating the entity's ecosystem with the digital collaboration room. In some embodiments, activating the isolate mode also means that the tokens that were generated by the orchestration service in step 704 for the users are revoked, canceled or otherwise deactivated, such that the tokens are no longer valid, so that the users lose their previous rights to gain access to the entity's digital collaboration room.

After step 708, the method 700 continues with either step 710 or step 712. At step 710, if the orchestration service receives a user input of the first authentication factor of the user, then the entity user is granted access to the digital collaboration room of the entity. In other words, if the user correctly enters the username and password of the corporate work email associated with the user according to the stored tenant data of the entity, then nothing appears to have changed, from the user's perspective, even though the isolate mode has been activated. The user can gain access to the digital collaboration room of the entity, despite the fact that the isolate mode has been activated.

On the other hand, if the orchestration service does not receive a user input of the first authentication factor of the user, but instead the orchestration service receives an indication that the user has forgotten the first authentication factor (such as the username and/or password for logging into the corporate email account of the user), then at step 712, the first authentication factor of the user is invalidated. In other words, if the user input indicates that the user has forgotten their username and/or password to their corporate email account, the orchestration service will not grant access to the digital collaboration room using the previously accepted first authentication factor of username and password.

Instead, at step 714, a notification is generated and sent to the user via the second authentication factor. In some embodiments, a notification typically is sent in the form of a text message to a mobile number of the user. The text message informs the user that the first authentication factor is now invalidated, and that the user must use the third authentication factor instead, in order to eventually obtain access to the digital collaboration room. Typically, the third authentication factor includes the backup email account of the user. In other words, rather than blocking the user entirely, after invalidating the first authentication factor, the orchestration service notifies the user via the second authentication factor (which is still valid) and reroutes the user to safer, more secure pathway to the digital collaboration room, by way of a third authentication factor (which is still valid) or handshake.

At step 716, a message to the user with a link to the digital collaboration room is generated and sent to the user by the orchestration service, based on the third authentication factor. In some embodiments, the third authentication factor is a backup email account or backup email address of the user, and the message is an email sent to the user's backup email account.

At step 718, after it is determined by the orchestration service that the user has accessed the link by accessing their backup email account and clicking on the link, the user is granted access of the digital collaboration room. However, it should be noted that if the token that was generated for the user at step 704 still exists, the orchestration service can first evaluate the token of the user to determine if they have permission to enter the digital collaboration room before determining whether to grant access to the digital collaboration room at step 718. In some instances, the token can be linked to a session policy for the user. That is, the actions of the user can be managed on a session-by-session basis.

If the entity user is granted access to the digital collaboration room at step 718, the method 700 can continue with an optional step (not shown) where a request to perform an action on a portion of the data from the user is received. For example, the user can submit a query to identify documents that are relevant to one or more keywords.

The method 700 may also include an optional step (not shown) of performing a hierarchical permissions analysis to determine if the user has permission to perform the action and access the portion of the data. The hierarchical permissions analysis can also include a step of determining if the user currently has permission to enter the digital collaboration room. As noted above, this can include evaluating an access right included in the token for the user.

Assuming that the permissions analysis is successful, the method 700 can include a step of retrieving the portion of the data from the database for the digital collaboration room and allowing the user to perform the action when the user currently has permission to enter the digital collaboration room and the user has permission to perform the action and access the portion of the data. If the permissions analysis is unsuccessful, the user can be presented with a message informing them that they lack permission to perform the requested action.

Figure 8:
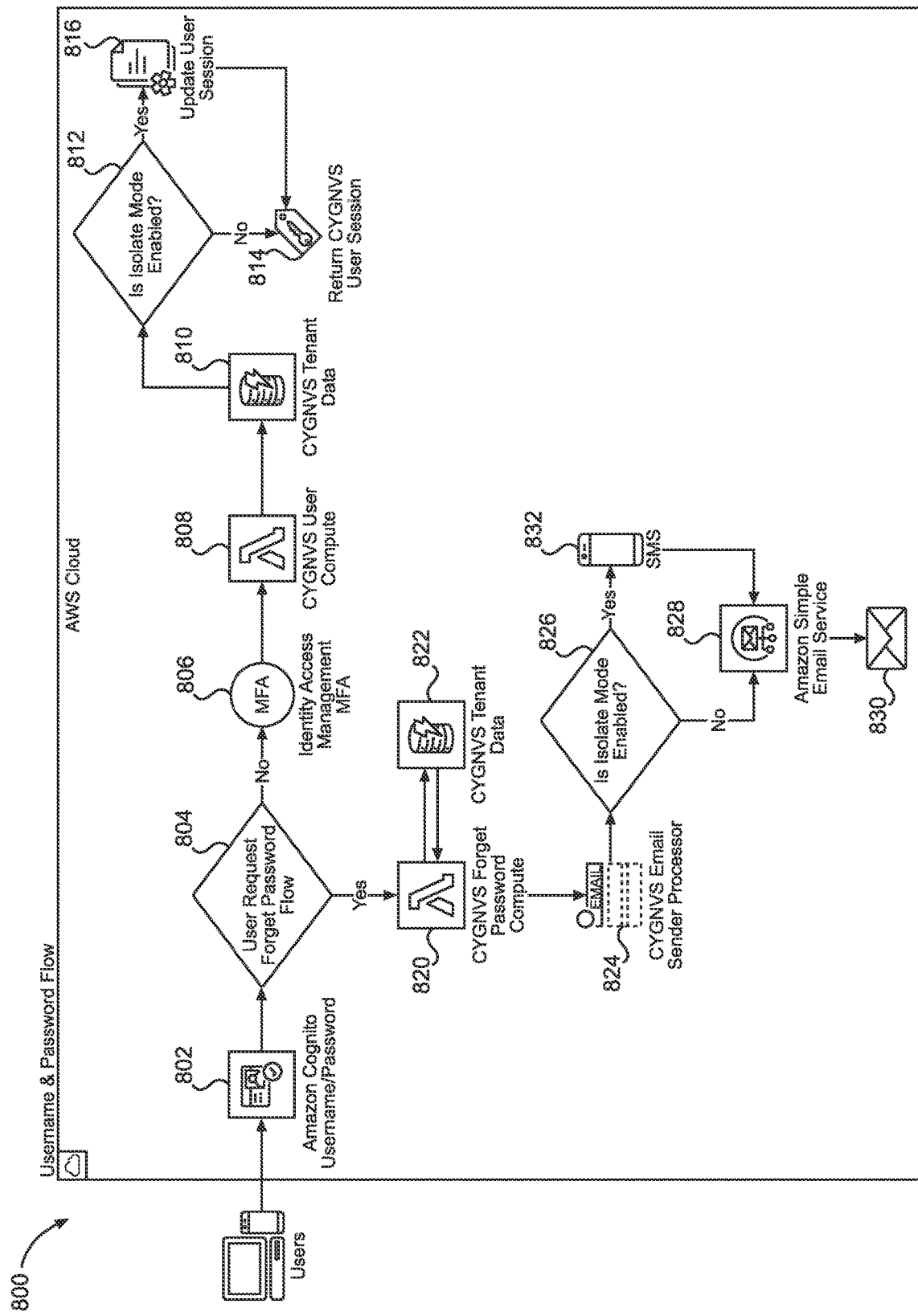
FIG. 8 is a flowchart of an example method of the present disclosure related to a username and password flow.

Turning now to FIG. 8, FIG. 8 depicts an exemplary flowchart 800 of the present disclosure relating to the username and password flow. The username and password flow or pathway provides the user access to the digital collaboration mode. The exemplary method is behind a computing cloud, such as AWS Cloud. In some embodiments, at step 802, the system uses Amazon Cognito to identify the user via an authentication of username/passcode (which, in some embodiments, can be considered the first authentication factor as described above). When a user attempts to log in, the user triggers the username and password flow. At step 804, the user will have an option to login or ask for a password reset of the user's corporate email account.

If the user chooses to login and the user successfully enter their credentials (username and password) relating to their corporate email account, then an identity access management MFA (multifactor authentication) is triggered at step 806. At steps 808 and 810, the orchestration service is triggered to check an associated database regarding the tenant data, to confirm the user's identity and grant the user a token, which will allow the user to use the application, (e.g., to communicate with the orchestration service, be granted tokens, etc.) and access the digital collaboration room. At step 812, the orchestration service also checks the tenant account of the entity, to determine whether the isolate mode has been activated or is turned on. If the isolate mode is turned off, at step 814, the user will return to their user session, such that the user can gain access to the digital collaboration room of the entity. If the isolate mode is turned on, at step 816, the user session is updated by the orchestration service, such that the user will still gain access to the digital collaboration room of the entity, even though the isolate mode is turned on.

Still referring to FIG. 8, if the user triggers the "forgot password" flow (by clicking on a "forgot password" button or some similar means) at step 820, then the orchestration service will check the database of tenant data at step 822 and determine whether the tenant's isolate mode is turned on. The user's "forgot password" request will be forwarded to an email sender processor at step 824. The orchestration service may include the email sender processor, or the email sender processor may be coupled to the orchestration service.

Next, at step 826, the orchestration service determines whether the tenant's isolate mode is turned on. If at step 826 the orchestration service determines that the tenant's isolate mode is off, at steps 828 and 830, a secure password reset code email is sent to the user's corporate email address using an email server, such as Amazon Simple Email Service.

On the other hand, if at step 826, the orchestration service determines that the tenant's isolate mode is turned on, then at step 832, a text message is sent to the user's mobile phone, indicating that the tenant's isolate mode is turned on and that the secure password rest code will be sent to their backup email account. A secure password reset code email is then sent to the user's backup email address using an email server, such as Amazon Simple Email Service.

Figure 9:
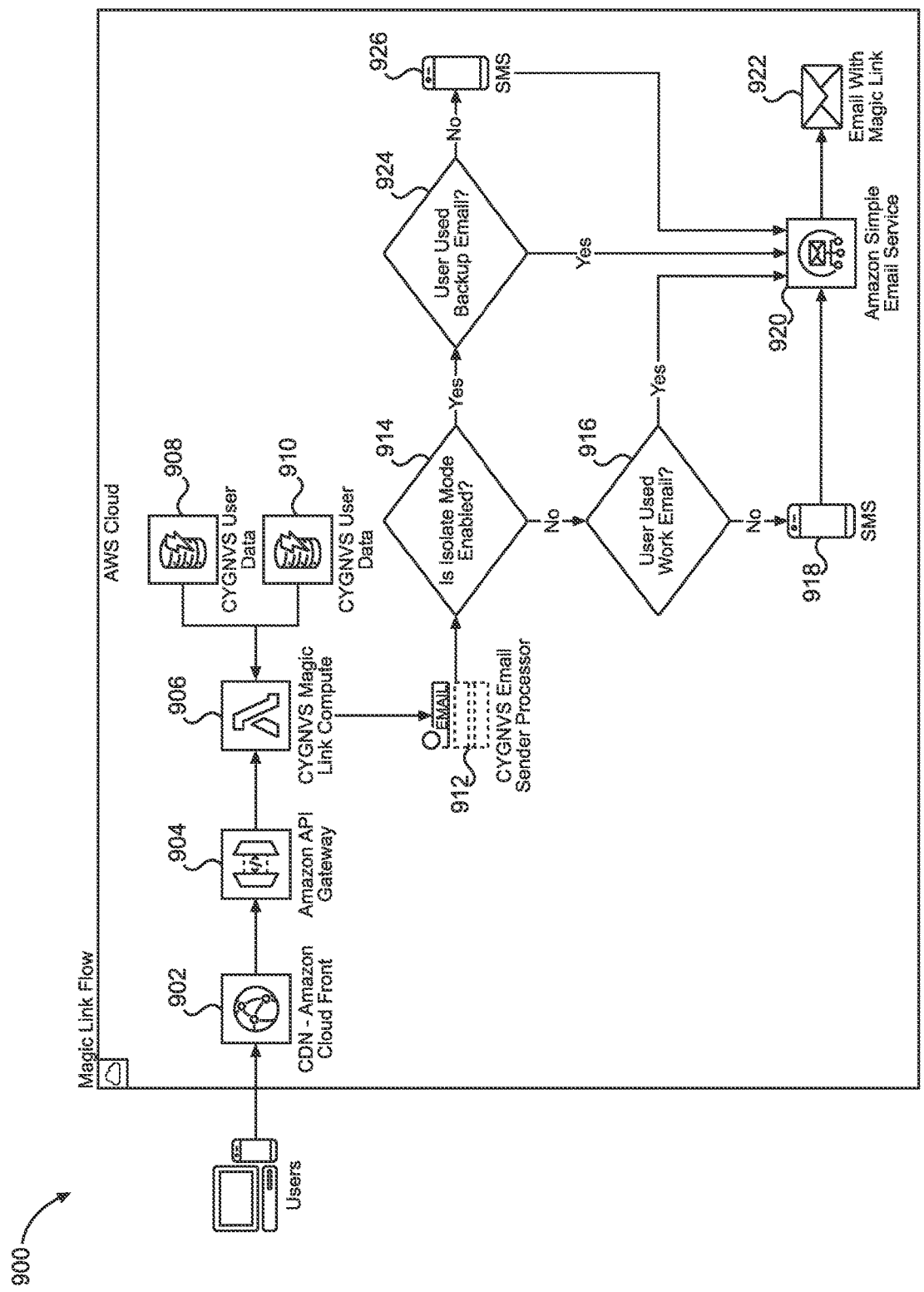
FIG. 9 is a flowchart of an example method of the present disclosure related to a magic link flow.

FIG. 9 is a flowchart of an example method 900 of the present disclosure related to a magic link flow. As mentioned previously, a user can request a magic link which is a login that does not require a password. The user's request navigates from a content delivery network (CDN, such as Amazon Cloud Front) to an API (application programming interface) gateway at step 902 and 904. At step 906, the API gateway triggers and communicates with the orchestration service. Then at steps 908 and 910, the orchestration service securely gathers or otherwise retrieves the user's basic details (to determine the user's corporate email address with the entity, the user's backup email address which is considered the second authentication factor, and the user's mobile number which is considered the third authentication). The orchestration service also retrieves the user's tenant account details, which will also include the information of whether the entity tenant's isolate mode is turned on or off.

At this point, at step 912, the user's request for a magic link is then forwarded from the orchestration service to the email sender processor. The orchestration service determines whether the isolate mode is on or off for the tenant at step 914 (typically by checking the tenant itself and/or the database of tenant data). If it is determined that by the orchestration service that the entity's isolate mode is turned on, then at step 924 the orchestration service evaluates whether the user used their backup email credentials to log in. If the user logged in using their corporate email credentials, then at step 926, the user is sent a text message from the orchestration service by way of the user's mobile phone. The user is notified in the text message that the first authentication factor (e.g., the user's corporate email account) is invalidated and they should login to their backup email account. At steps 920 and 922, the magic link is sent in an email message to the user's backup email account. Once the user logs in, gains access to their backup email account, and clicks on the magic link of the email message, then they are able to access the digital collaboration room.

If, however, at step 914 it is determined that by the orchestration service that the entity's isolate mode is turned off, then the orchestration service determines whether the user logged in using their corporate email account credentials at step 916. If the user did not use their corporate email account credentials to log in, then the flow continues with step 918, at which point the orchestration service sends a text message to the user's mobile phone, notifying them that they should use their corporate email credentials to log in. At steps 920 and 922, an email is sent by the orchestration service (with the help of an email service) to the user's corporate email account containing a magic link. When the user accesses their corporate email account and clicks on the magic link, the user gains access to the digital collaboration room.

However, if at steps 914 and 916, the orchestration service determines that the user logged in using their corporate email account credentials and the entity's isolate mode is turned off, the flow continues with steps 920 and 922. At steps 920 and 922, the magic link is sent in an email message to the user's corporate email account. Once the user gains access to their corporate email account and clicks on the magic link of the email message, then they will be able to access the digital collaboration room.

Figure 10:
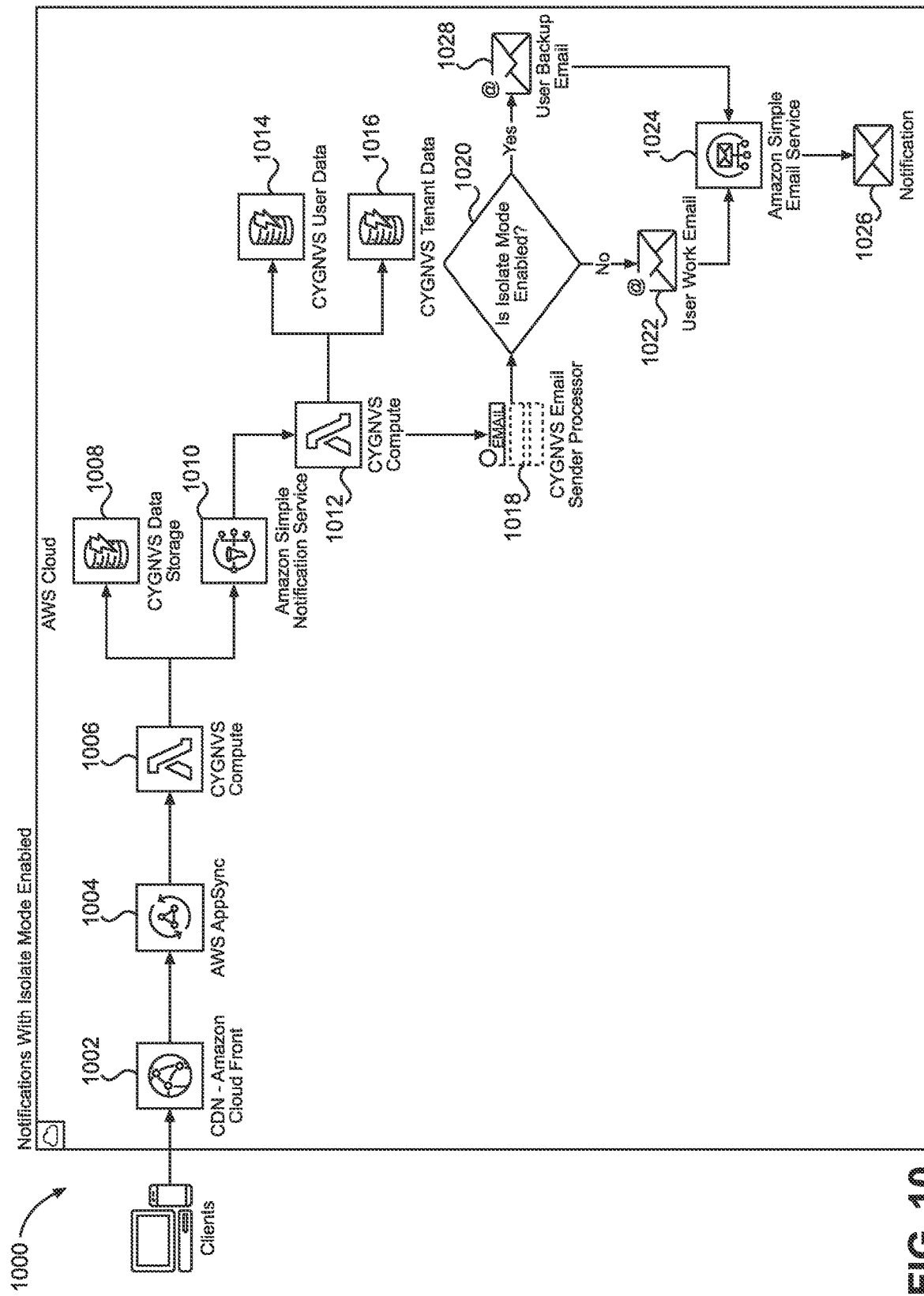
FIG. 10 is a flowchart of an example method of the present disclosure related to notifications with isolate mode enabled.

FIG. 10 is a flowchart of an example method 1000 of the present disclosure related to notifications with isolate mode enabled. One aspect of the present disclosure is the need to direct communications to the users in a secure and proper manner, when the isolate mode is enabled for a given tenant/entity. The method 1000 begins when a user triggers an action in the application. At steps 1002 and 1004, the user's request navigates from the CDN into an API routing manager, such as AWS AppSync. At steps 1006, 1008 and 1110, the orchestration service accesses its data storage and an event is published using a notification service, such as Amazon Simple Notification Service at step 1010. If a user is tracking a topic (perhaps by a subscribed topic), and a change is made regarding that topic, then the user is notified of the change. At steps 1012, 1014 and 1016, the orchestration service then accesses both the user data and the tenant data. At step 1018, the user's request is directed to the email sender processor.

At step 1020, if the orchestration service determines that the isolate mode is off, then the orchestration service directs communications from the entity to the user's corporate email account at steps 1022, 1024 and 1026. If the orchestration service determines that the isolate mode is on, the orchestration service directs communication from the entity to the user's backup email account at steps 1028, 1024 and 1026.

Figure 11:
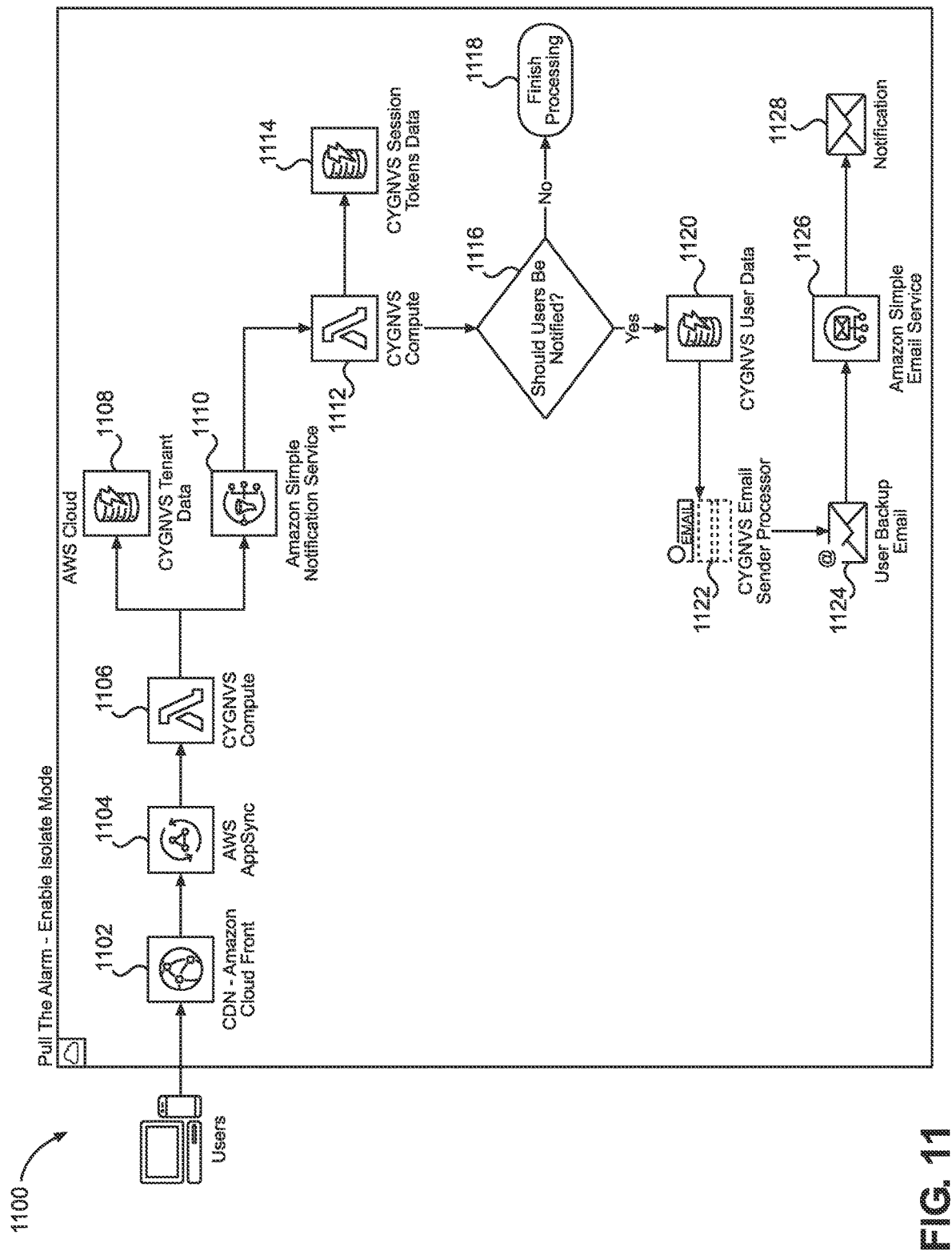
FIG. 11 is a flowchart of an example method of the present disclosure related to enabling isolate mode.

FIG. 11 is a flowchart of an example method 1100 of the present disclosure related to enabling isolate mode. This is otherwise called "pulling the alarm." The isolate mode begins with a request to enable isolate mode. As mentioned previously, the request to enable isolate mode is typically initiated by the entity at the tenant level or by a vendor user on behalf of the entity. At steps 1102 and 1104, the request is navigated from the CDN to an API routing manager, such as AWS AppSync. At steps 1106 and 1108, the orchestration service handles the request, and the records of the specific tenant in the tenant database are updated to show that the isolate mode is on for the given tenant.

At step 1110, the orchestration service communicates with a notification service, such as the Amazon Simple Notification Service. Once the isolate mode is triggered, at steps 1112 and 1114, the orchestration service invalidates all active user sessions, all users' tokens (by wiping out the applicable database) and any API keys held by any tenant. At step 1116, the orchestration service also determines if the users should be notified. If all the users are not to be notified (for instance, if the activation of the isolate mode is merely a test), then the method 1100 concludes at step 1118 and the processing ends. If at step 1116 the orchestration service determines that the users are to be notified, then the orchestration service checks the user data of the tenant at step 1120. The orchestration service determines which users are to be notified. Using an email sender processor at steps 1122-1128, the orchestration service determines a user's backup email account and then sends an email informing the user that the isolate mode is on for the tenant, using an email service such as the Amazon Simple Email Service. In some embodiments, the orchestration service may send an email to the user's backup email account, where the email includes a magic link to the digital collaboration room for the user to click on.

Figure 12:
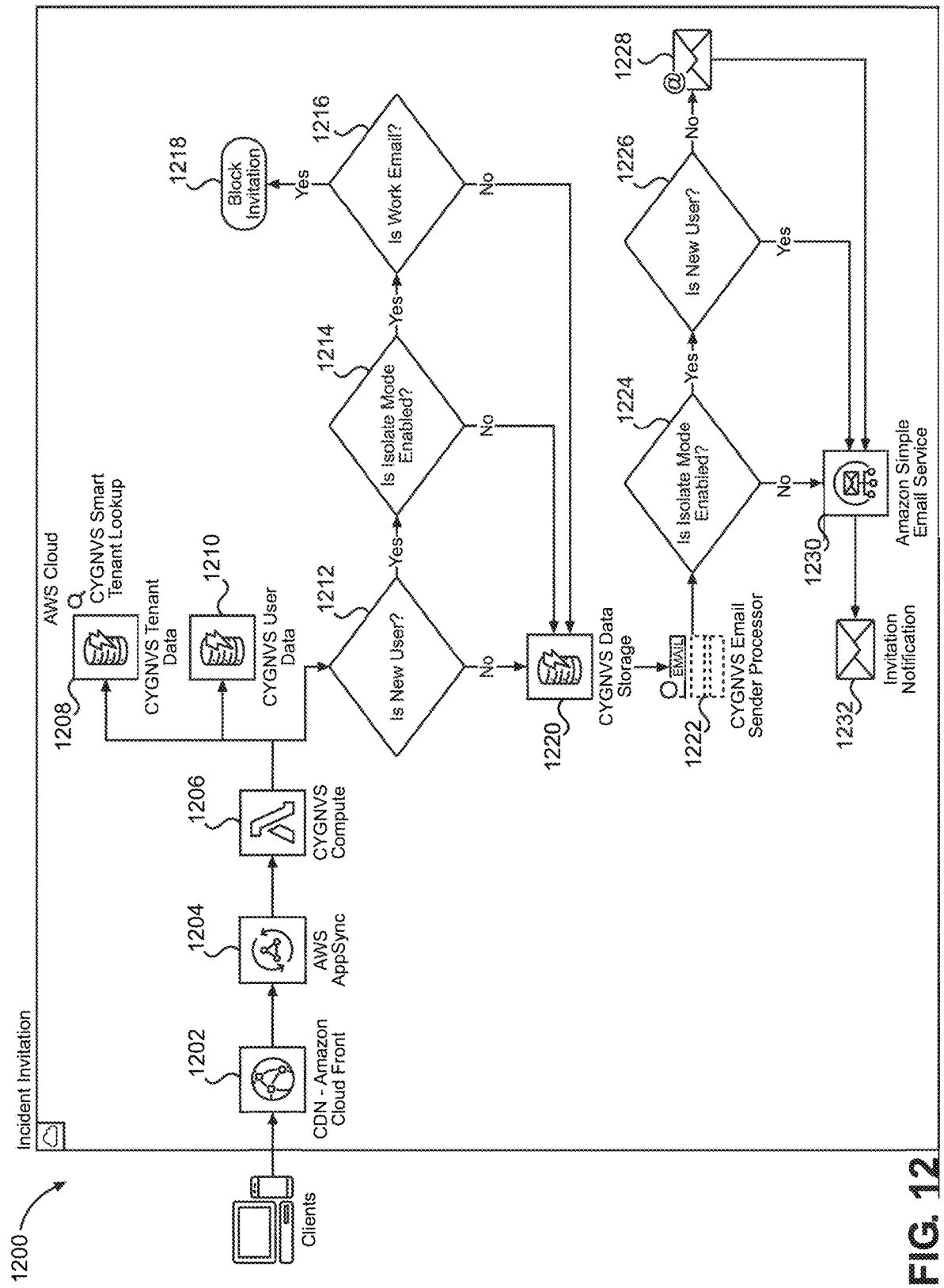
FIG. 12 is a flowchart of an example method of the present disclosure related to incident invitation.

FIG. 12 is a flowchart of an example method 1200 of the present disclosure related to incident invitation. The method 1200 manages how to invite a user into an incident, regardless of whether the tenant is in "peace time" and "war time" (e.g., when the isolate mode is on). A user is invited to join the platform, typically using a user's corporate email, in order for the user to access the digital collaboration room of the entity/tenant.

At steps 1202 and 1204, the request navigates from the content delivery network into an API routing manager, such as AWS AppSync. At steps 1206, 1208 and 1210, the user data and the tenant data are matched by the orchestration service based on the user's and tenant domains. In other words, if the user's domain matches that with the tenant's domain, then the user presumably was invited by the tenant entity.

Next, at step 1212, the orchestration service determines if the user is a new user. If the orchestration service determines that the user is a new user to the platform, and then the orchestration service determines at step 1214 that the isolate mode is on for a given tenant that purportedly wishes to invite the user to gain access to the incident, this may be a suspicious activity. If the isolate mode is on, and the orchestration service determines that the invitation to the new user includes an email that belongs to the compromised account at step 1216, the invitation for the user to register with the platform is blocked at step 1218.

If at step 1212 it is determined that the user is not a new user, then at steps 1220 and 1222, the orchestration service checks its data storage for the tenant, and activates its email sender processor. The email sender processor then takes the responsibility at step 1224 to determine whether the isolate mode is on or off. If the isolate mode is off, then at steps 1230 and 1232, the email sender processor of the platform, with the help of an email service, sends an email, inviting the user to join the incident. If the isolate mode is on at step 1224 and the email sender processor determines that the user is a new user at step 1226, then the email sender processor of the platform, with the help of an email service, sends an email, inviting the user to join the incident. If the isolate mode is on at step 1224 and the email sender processor determines that the user is not a new user at step 1226, then at steps 1228, 1230 and 1232 the email sender processor of the platform, with the help of an email service, sends an email to the user's backup email address, inviting the user to join the incident.

It should be noted that the steps described herein or depicted in any of the figures can be performed in any order. The present disclosure is not limited to merely the specific order of the method steps as described herein. Furthermore, the method steps for any of the exemplary methods provided herein may be performed using any component of the platform, including but not limited to the orchestration service, as depicted in FIG. 1 and as described herein.

What is claimed is:

1. A method comprising:
    establishing, via an orchestration service, a digital collaboration room for an entity, the entity having control to grant permissions to users regarding the digital collaboration room and to dynamically modify permissions of the users in real time, the orchestration service being a cloud resource where the digital collaboration room, owned by the entity, is hosted and made accessible to the users;
    receiving and storing three authentication factors of a user, the three authentication factors including a first authentication factor relating to a corporate email account of the user assigned by the entity, a second authentication factor and a third authentication factor;
    generating a token for the user that represents rights or permissions granted to the user; and
    upon an entity's request and in response to an event:
        activating an isolate mode and isolating the digital collaboration room;
        when user input of the first authentication factor of the user is received, granting access of the digital collaboration room to the user; and
        when user input is received, indicating that the first authentication factor has been forgotten:
            invalidating the first authentication factor of the user;
            generating and sending, via the second authentication factor, a notification to the user that the first authentication factor has been invalidated and that the user must use a third authentication factor instead;
            generating and providing, based on the third authentication factor, a message to the user, the message including a link to the digital collaboration room; and
            when the user accesses the link utilizing the third authentication factor, granting access of the digital collaboration room to the user.

2. The method of claim 1, wherein the second authentication factor comprises a mobile number assigned to the user, and the third authentication factor relates to a backup email account of the user.

3. The method of claim 1, wherein the second authentication factor comprises a mobile phone number assigned to the user as a primary second authentication factor, as well as a backup email account of the user as an alternate second authentication factor.

4. The method of claim 1, wherein the generating and sending step further comprises generating and sending, via the second authentication factor, a text message to a mobile number assigned to the user, the text message notifying the user that the first authentication factor has been invalidated and that the user must use a third authentication factor instead to access the digital collaboration room, the third authentication factor relating to a backup email account assigned to the user.

5. The method of claim 1, wherein the users include one or more entity users and one or more vendor users.

6. The method of claim 1, wherein the entity's request to activate the isolate mode is submitted by a vendor user or an entity user to the orchestration service, on behalf of the entity.

7. The method of claim 6, wherein an ability of the vendor user or the entity user to submit the entity's request to activate the isolate mode is enabled by dynamic tenancy and dynamic provision of permissions as implemented by the orchestration service.

8. The method of claim 1, wherein the entity's request to activate the isolate mode is submitted by the entity itself to the orchestration service.

9. The method of claim 1, wherein an entity user is not permitted by the orchestration service to submit a request to activate the isolate mode on behalf of the entity.

10. The method of claim 1, wherein the third authentication factor further includes a multifactor authentication service.

11. The method of claim 10, wherein the multifactor authentication service generates a secret code to be entered by the user to access a backup email account assigned to the user.

12. The method of claim 1, wherein generating the token comprises encoding a tenant identifier, a digital collaboration room identifier, an access right for the user to enter the digital collaboration room, and a role for the user, the role specifying a first set of permissions that indicate actions that can be performed by the user.

13. The method of claim 1, wherein activating the isolate mode and isolating the digital collaboration room further comprises severing all integrations on multiple levels with the digital collaboration room and blocking any further attempts of integrating with the digital collaboration room.

14. The method of claim 1, further comprising:
receiving a request to perform an action on a portion of data;
in order to enable an entity's dynamic modification of permissions of the user in real time, performing a hierarchical permissions analysis by the orchestration service; and
retrieving the portion of the data from a database for the digital collaboration room and allowing the user to perform the action when the user currently has permission to enter the digital collaboration room and the user has permission to perform the action and access the portion of the data.

15. A system comprising:
a processor; and
a memory for storing executable instructions that, when executed by the processor, cause the processor to perform a method, the method comprising:
establishing, via an orchestration service, a digital collaboration room for an entity, the entity having control to grant permissions to users regarding the digital collaboration room and to dynamically modify permissions of the users in real time, the orchestration service being a cloud resource where the digital collaboration room, owned by the entity, is hosted and made accessible to the users;
upon user registration, receiving and storing three authentication factors of a user, the three authentication factors including a first authentication factor relating to a corporate email account of the user assigned by the entity, a second authentication factor and a third authentication factor;
generating a token for the user that represents rights or permissions granted to the user; and
upon an entity's request and in response to an event:
activating an isolate mode and isolating the digital collaboration room;
when user input of the first authentication factor of the user is received, granting access of the digital collaboration room to an entity user; and
when user input is received, indicating that the first authentication factor has been forgotten:
invalidating the first authentication factor of the user;
generating and sending, via the second authentication factor, a notification to the user that the first authentication factor has been invalidated and that the user must use a third authentication factor instead;
generating and providing, based on the third authentication factor, a message to the user, the message including a link to the digital collaboration room; and
when the user accesses the link utilizing the third authentication factor, granting access of the digital collaboration room to the user.

16. The system of claim 15, wherein the second authentication factor comprises a mobile number assigned to the user, and the third authentication factor relates to a backup email account of the user.

17. The system of claim 15, wherein the second authentication factor comprises a mobile phone number assigned to the user as a primary second authentication factor, as well as a backup email account of the user as an alternate second authentication factor.

18. The system of claim 15, wherein the generating and sending step further comprises generating and sending, via the second authentication factor, a text message to a mobile number assigned to the user, the text message notifying the user that the first authentication factor has been invalidated and that the user must use a third authentication factor instead to access the digital collaboration room, the third authentication factor relating to a backup email account assigned to the user.

19. The system of claim 15, wherein the users include one or more entity users and one or more vendor users.

20. The system of claim 15, wherein the entity's request to activate the isolate mode is submitted by a vendor user or the entity user to the orchestration service, on behalf of the entity.

21. The system of claim 20, wherein an ability of the vendor user or the entity user to submit the entity's request to activate the isolate mode is enabled by dynamic tenancy and dynamic provision of permissions as implemented by the orchestration service.

22. The system of claim 15, wherein the entity's request to activate the isolate mode is submitted by the entity itself to the orchestration service.

23. The system of claim 15, wherein the entity user is not permitted by the orchestration service to submit a request to activate the isolate mode on behalf of the entity.

24. The system of claim 15, wherein the third authentication factor further includes a multifactor authentication service.

25. The system of claim 24, wherein the multifactor authentication service generates a secret code to be entered by the user to access a backup email account of the user.

26. The system of claim 15, wherein generating the token comprises encoding a tenant identifier, a digital collaboration room identifier, an access right for the entity user to enter the digital collaboration room, and a role for the entity user, the role specifying a first set of permissions that indicate actions that can be performed by the entity user.

27. The system of claim 15, wherein activating the isolate mode and isolating the digital collaboration room further comprises severing all integrations on multiple levels with the digital collaboration room and blocking any further attempts of integrating with the digital collaboration room.

28. The system of claim 15, the method further comprising:
receiving a request to perform an action on a portion of data;
in order to enable an entity's dynamic modification of permissions of the user in real time, performing a hierarchical permissions analysis by the orchestration service; and retrieving the portion of the data from a database for the digital collaboration room and allowing the user to perform the action when the user currently has permission to enter the digital collaboration room and the user has permission to perform the action and access the portion of the data.

29. A method comprising:

establishing, via an orchestration service, a digital collaboration room for an entity, the entity having control to grant permissions to users regarding the digital collaboration room and to dynamically modify permissions of the users in real time, the orchestration service being a cloud resource where the digital collaboration room, owned by the entity, is hosted and made accessible to the users, the users including at one or more entity users and one or more vendor users;

receiving and storing three authentication factors of a user, the three authentication factors including a first authentication factor relating to a corporate email account of the user assigned by the entity, a second authentication factor being a mobile number of the user, and a third authentication factor relating to a backup email account of the user;

generating a token for the user that represents rights or permissions granted to the user; and upon an entity's request and in response to an event:
   activating an isolate mode, thereby isolating the orchestration service and the digital collaboration room;
   when user input of the first authentication factor of the entity user is received, granting access of the digital collaboration room to the user; and
   when user input is received, indicating that the first authentication factor has been forgotten:
      invalidating the first authentication factor of the user;
      generating and sending, via the second authentication factor, a notification to the user that the first authentication factor has been invalidated and that the user must use a third authentication factor instead;
      generating and providing, based on the third authentication factor, a message to the user, the message including a link to the digital collaboration room, the message being sent to the backup email account of the user; and
      when the user accesses the link, granting access of the digital collaboration room to the user.

* * * * *